United States Patent [19]

Toshida et al.

[11] Patent Number: 5,185,097
[45] Date of Patent: Feb. 9, 1993

[54] POLYMERIC LIQUID-CRYSTALLINE COMPOUND, LIQUID-CRYSTAL COMPOSITION CONTAINING IT, AND LIQUID-CRYSTAL DRIVE

[75] Inventors: Yomishi Toshida, Yokohama; Kazuo Yoshinaga, Tokyo; Koichi Sato, Atsugi, all of Japan

[73] Assignee: Canon Kabushiki Kaisha, Tokyo, Japan

[21] Appl. No.: 631,899

[22] Filed: Dec. 21, 1990

[30] Foreign Application Priority Data

Dec. 29, 1989 [JP] Japan .................. 1-343106
Oct. 19, 1990 [JP] Japan .................. 2-280691

[51] Int. Cl.$^5$ .................. C09K 19/52; C09K 19/06; C08G 63/00; G02F 1/13
[52] U.S. Cl. .................. 252/299.01; 252/299.6; 252/299.61; 252/299.66; 252/299.68; 528/176; 359/103
[58] Field of Search .................. 252/299.01, 299.66, 252/299.61, 299.68, 299.63; 350/340, 341, 350 R; 528/304, 176, 194; 546/359, 346

[56] References Cited

U.S. PATENT DOCUMENTS

| | | | |
|---|---|---|---|
| 4,652,626 | 3/1987 | Orii et al. | 524/194 |
| 4,698,397 | 10/1987 | Toya et al. | 525/437 |
| 4,721,376 | 1/1988 | Yoshinaga et al. | 359/104 X |
| 4,738,811 | 4/1988 | Hara et al. | 264/211.12 |
| 4,746,722 | 5/1988 | Iida et al. | 528/194 |
| 4,798,680 | 1/1989 | Nohira et al. | 252/299.01 |
| 4,816,178 | 3/1989 | Katagiri et al. | 252/299.6 |
| 4,857,626 | 8/1989 | Koshiro et al. | 528/176 |
| 4,876,027 | 10/1989 | Yoshinaga et al. | 252/299.65 |
| 4,880,560 | 11/1989 | Yoshinaga et al. | 252/299.01 |
| 4,882,085 | 11/1989 | Yoshinaga et al. | 252/299.61 |
| 4,892,675 | 1/1990 | Nohira et al. | 252/299.01 |
| 4,915,867 | 4/1990 | Morita et al. | 252/299.5 |
| 4,965,591 | 10/1990 | Kurabayashi et al. | 346/108 |
| 5,011,623 | 4/1991 | Yoshinaga et al. | 252/299.5 |

FOREIGN PATENT DOCUMENTS

| | | | |
|---|---|---|---|
| 0292244 | 11/1988 | European Pat. Off. | |
| 0295106 | 12/1988 | European Pat. Off. | |
| 0312331 | 4/1989 | European Pat. Off. | 528/308 |
| 0322703 | 7/1989 | European Pat. Off. | |
| 3603267 | 8/1987 | Fed. Rep. of Germany | 252/299.01 |
| 63-72784 | 4/1988 | Japan | |
| 01-93553 | 4/1988 | Japan | |
| 63-99204 | 4/1988 | Japan | |
| 63-161005 | 7/1988 | Japan | |
| 64-65124 | 3/1989 | Japan | |
| 2202981 | 8/1990 | Japan | |

*Primary Examiner*—Robert L. Stoll
*Assistant Examiner*—C. Harris
*Attorney, Agent, or Firm*—Fitzpatrick, Cella, Harper & Scinto

[57] ABSTRACT

Provided is a polymeric liquid-crystalline compound having in its repeating unit a moiety represented by the following formula (M)

$$X_1-A-X_2-B \qquad (M)$$

wherein A represents a bicyclic mesogen; B represents a flexible group represented by the formula

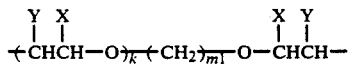

wherein X represents a hydrogen atom or a methyl group and Y represents a hydrogen atom or a methyl group, provided that X is not the same as Y, k is 0 or 1, and m1 is 1 to 18, or

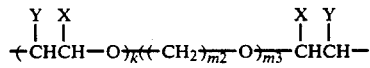

wherein X represents a hydrogen atom or a methyl group and Y represents a hydrogen atom or a methyl group, provided that X is not the same as Y, k is 0 or 1, m2 is 2 to 10 and m3 is 2 to 5; and $X_1$ and $X_2$ each represent a group containing any one of an ester bond, an ether bond and a carbonate bond, and may be the same or different from each other.

52 Claims, 5 Drawing Sheets

POLYMERIC LIQUID-CRYSTALLINE COMPOUND, LIQUID-CRYSTAL COMPOSITION CONTAINING IT, AND LIQUID-CRYSTAL DRIVE

BACKGROUND OF THE INVENTION

1. Field of the Invention

The present invention relates to a novel polymeric liquid-crystalline compound having an optically active group on its polymer main chain, a liquid-crystal composition comprising the polymeric liquid-crystalline compound, and a liquid-crystal device making use of them.

2. Related Background Art

Polymeric liquid-crystal materials have recently attracted notices as high-function materials. This is considered due to the fact that polymeric liquid crystals have the following superior characteristic features.

(1) They can be readily formed into thin films, and make it possible for liquid-crystal devices to have a large area, which has been difficult in low-molecular liquid crystals.

(2) Application of aligning treatment such as stretching can give a good state of alignment.

(3) A liquid-crystal state of polymers can be retained even at a temperature of not higher than the glass transition temperature, and hence the memory performance can be greatly improved, compared with the case in which low-molecular liquid crystals are used.

A problem arising when polymeric liquid crystals are put into practical use has been said to be a slow speed of response to an electric field. The speed of response to an electric field, however, can be considered to be greatly improved by the use of a ferroelectric polymeric liquid crystal having a spontaneous polarization as in low-molecular liquid crystals.

In order for a polymeric liquid crystal to exhibit a ferroelectricity, an optically active group must be introduced into a flexible spacer (a flexible chain).

With regard to what are called side-chain type polymeric liquid crystals having an acrylic or methacrylic main chain or the like, a report has already been made on ferroelectric polumeric liquid crystals having various molecular structures (see, for example, Japanese Patent Application Laid-Open No. 63-72784, No. 63-99204 and No. 63-161005).

On the other hand, main-chain type polymeric liquid crystals are superior in strength when they are formed into films, and also their molecular chains can be readily aligned by stretching or the like, compared with the side-chain type polymeric liquid crystal. As a result, they can be superior in view of, e.g., the fact that the films can be readily made to have large areas even when a low-molecular liquid crystal is contained.

Such a main-chain type ferroelectric polymeric liquid crystal having a bicyclic biphenyl group as a mesogen and an optically active group in the main chain has been reported in Collections of Lecture Drafts for The 14th Liquid Crystal Forum, pp.56–57, September 1988, Japanese Patent Application Laid-Open No. 64-65124.

What is disclosed in this publication, however, is a monotropic polymeric liquid crystal that renders a chiral smectic phase only when temperature is lowered, and it has been difficult for a stable liquid-crystal phase to be exhibited. in addition, because of use of a specific optically active group, this liquid crystal has a narrow range of selection in view of the control of temperature characteristics, optical characteristics and electrical characteristics and also has not been well satisfactory in view of, e.g., its electrical characteristics.

SUMMARY OF THE INVENTION

As a result of intensive researches put forward on the basis of such conventional techniques, the present inventors have discovered a novel ferroelectric polymeric liquid-crystalline compound, and thus have accomplished the present invention.

An object of the present invention is to provide a novel polymeric liquid-crystalline compound or copolymerized polymeric liquid-crystalline compound capable of rendering a broad chiral smectic phase (an Sm* phase) and also capable of readily forming a thin film or being formed into a film, and a liquid-crystal composition containing such polymeric liquid-crystalline compounds and other low-molecular liquid crystal or the like.

Another object of the present invention is to provide a liquid-crystal device making use of the above polymeric liquid-crystalline compound or copolymerized polymeric liquid-crystalline, compound, or a liquid-crystal composition comprising these polymeric liquid-crystalline compounds and other polymeric compound (including a polymeric liquid crystal) or low-molecular compound (including a low-molecular liquid crystal), and thereby making it possible to readily achieve large-area display, to exhibit a good switching effect and to be utilized as a device in which various electro-optic effects are applied.

The present invention provides a polymeric liquid-crystalline compound having in its repeating unit a moiety represented by the following formula (M), a liquid-crystal composition comprising said polymeric liquid-crystalline compound, and a liquid-crystal device.

$$X_1-A-X_2-B \qquad (M)$$

wherein A represents a bicyclic mesogen; B represents a flexible group represented by the formula

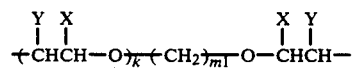

wherein X represents a hydrogen atom or a methyl group and Y represents a hydrogen atom or a methyl group, provided that X is not the same as Y, k is 0 or 1, and m1 is 1 to 18, or

wherein X represents a hydrogen atom or a methyl group and Y represents a hydrogen atom or a methyl group, provided that X is not the same as Y, k is 0 or 1, m2 is 2 to 10 and m3 is 2 to 5; and $X_1$ and $X_2$ each represent a group containing any one of an ester bond, an ether bond and a carbonate bond, and may be the same or different from each other.

More specifically, the present invention provides a polymeric liquid-crystalline compound comprising a main chain having a repeating unit represented by the following formula (I) or a copolymerized polymeric liquid-crystalline compound represented by the following formula (II), and a liquid-crystal composition containing these compounds.

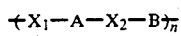  (I)

  (II)

wherein A represents a bicyclic mesogen; B represents a flexible group represented by the formula

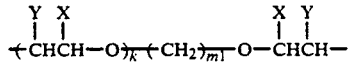

wherein X represents a hydrogen atom or a methyl group and Y represents a hydrogen atom or a methyl group, provided that X is not the same as Y, k is 0 or 1, and m1 is 1 to 18,
or

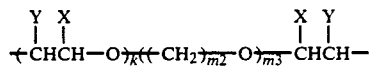

wherein X represents a hydrogen atom or a methyl group and Y represents a hydrogen atom or a methyl group, provided that X is not the same as Y, k is 0 or 1, m2 is 2 to 10 and m3 is 2 to 5;
C represents a mesogen group which may be the same as or different from A; D represents a group represented by the same formula as B but with a different molecular structure or represents a different flexible group; $X_1$ and $X_2$ each represent a group containing any one of an ester bond, an ether bond and a carbonate bond, and may be the same or different from each other; n represents 5 to 1,000; and $x+y=1$.

The present invention also provides a liquid-crystal device comprising a substrate and, provided thereon, a film comprising the polymeric liquid-crystalline compound comprised of the repeating unit represented by the above formula (I) or copolymerized polymeric liquid-crystalline compound represented by the formula (II), or a liquid-crystal composition containing these compounds.

Of the copolymerized polymeric liquid-crystalline compound of the formula (II), the present invention particularly provides a copolymerized polymeric liquid-crystalline compound having a repeating unit of a polymeric liquid crystal represented by the following formula (III₁) whose homopolymer renders the smectic C phase.

  (III₁)

wherein C represents a mesogen group; E represents a flexible group containing no optically active group; and $X_1$ and $X_2$ each represent a group containing any one of an ester bond, an ether bond and a carbonate bond.

More specifically, the present invention provides a copolymerized polymeric liquid-crystalline compound comprising a main chain having a repeating unit represented by the following formula (III), and a liquid-crystal composition containing at least one of copolymerized polymeric liquid-crystalline compounds having such a repeating unit.

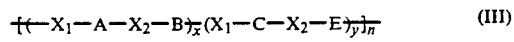  (III)

wherein A represents a bicyclic mesogen; B represents a flexible group represented by the formula

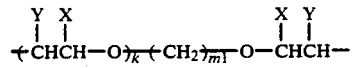

wherein X represents a hydrogen atom or a methyl group and Y represents a hydrogen atom or a methyl group, provided that X is not the same as Y, k is 0 or 1, and m1 is 1 to 18,
or

wherein X represents a hydrogen atom or a methyl group and Y represents a hydrogen atom or a methyl group, provided that X is not the same as Y, k is 0 or 1, m2 is 2 to 10 and m3 is 2 to 5;
C represents a mesogen group which may be the same as or different from A; E represents a flexible group containing no optically active group; $X_1$ and $X_2$ each represent a group containing any one of an ester bond, an ester bond and a carbonate bond, and may be the same or different from each other; n represents 5 to 1,000; $x+y=1$; and the homopolymer having a repeating unit of the polymeric liquid crystal represented by

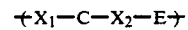

in the formula renders the smectic C phase.

The present invention further provides a liquid-crystal device comprising a substrate and, provided thereon, a film comprised of the chiral smectic copolymerized polymeric liquid-crystalline compound represented by the formula (III) or a liquid-crystal composition containing at least one of such copolymerized polymeric liquid-crystalline compounds.

The present invention, when the above A is represented by

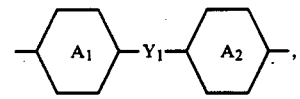

also provides a polymeric liquid-crystalline compound comprising a main chain having a repeating unit represented by the following formula (Ia).

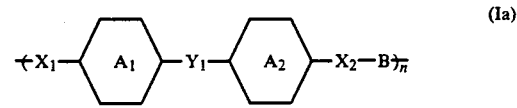  (Ia)

wherein

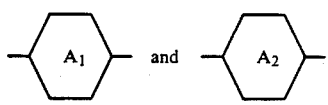

are each selected from any one of

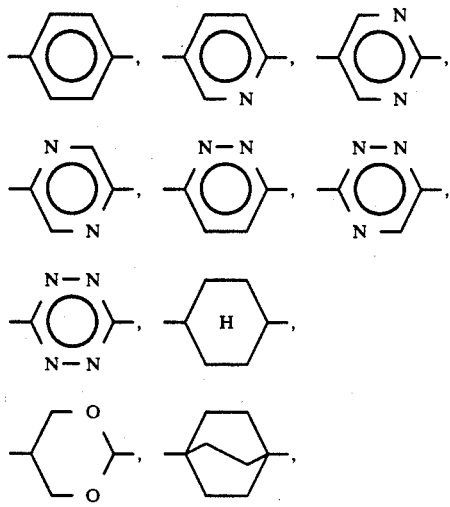

provided that at least one of

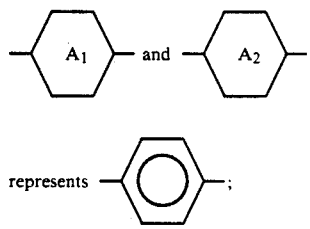

represents 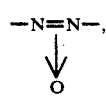;

$Y_1$ represents any one of a single bond, —CH=CH—, —C≡C—, —N=N—,

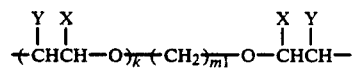

—CH=N—, —CH₂CH₂— and —CH₂O—; B represents a flexible group represented by the formula $$+\text{CHCH}-\text{O}\overset{Y\ X}{\underset{\ \ }{|\ |}}_k(\text{CH}_2)_{m1}-\text{O}-\overset{X\ Y}{\underset{\ \ }{|\ |}}\text{CHCH}-$$

wherein X represents a hydrogen atom or a methyl group and Y represents a hydrogen atom or a methyl group, provided that X is not the same as Y, k is 0 or 1, and m1 is 1 to 18, or $$+\text{CHCH}-\text{O}\overset{Y\ X}{\underset{\ \ }{|\ |}}_k((\text{CH}_2)_{m2}-\text{O})_{m3}\overset{Y\ X}{\underset{\ \ }{|\ |}}\text{CHCH}-$$

wherein X represents a hydrogen atom or a methyl group and Y represents a hydrogen atom or a methyl group, provided that X is not the same as Y, k is 0 or 1, m2 is 2 to 10 and m3 is 2 to 5;

$X_1$ and $X_2$ each represent a group containing any one of an ester bond, an ether bond and a carbonate bond, and may be the same or different from each other; and n represents 5 to 1,000.

Similarly, the present invention also provides a liquid-crystal composition comprising the compound of the formula (Ia), and a liquid-crystal device comprising such a liquid-crystal composition.

The present invention further provides a copolymerized polymeric liquid-crystalline compound comprising a main chain having a repeating unit represented by the following formula (IIa), a liquid-crystal composition comprising such a compound, and a liquid-crystal device comprising such a liquid-crystal composition.

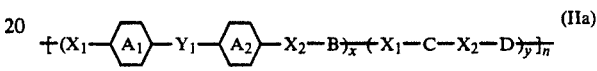 (IIa)

wherein

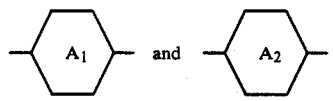

are each selected from any one of

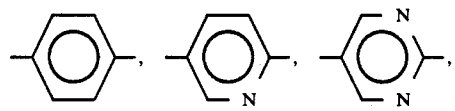

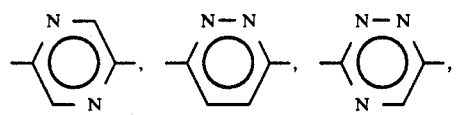

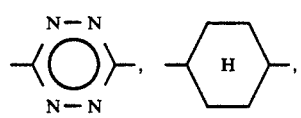

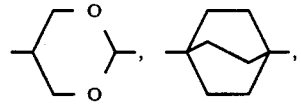

provided that at least one of

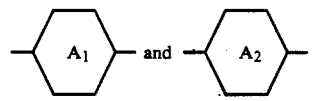

represents 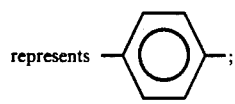;

$Y_1$ represents any one of a single bond, —CH=CH—, —C≡C—, —N=N—,

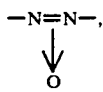

—CH=N—, —CH₂CH₂— and —CH₂O—; B represents a flexible group represented by the formula

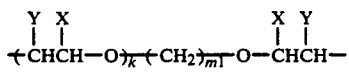

wherein X represents a hydrogen atom or a methyl group and Y represents a hydrogen atom or a methyl group, provided that X is not the same as Y, k is 0 or 1, and m1 is 1 to 18,
or

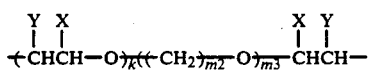

wherein X represents a hydrogen atom or a methyl group and Y represents a hydrogen atom or a methyl group, provided that X is not the same as Y, k is 0 or 1, m2 is 2 to 10 and m3 is 2 to 5;
C represents a mesogen group which may be the same as or different from

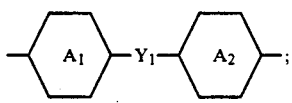

D represents a group represented by the same formula as B but with a different molecular structure or represents a different flexible group; $X_1$ and $X_2$ each represent a group containing any one of an ester bond, an ether bond and a carbonate bond, and may be the same or different from each other; n represents 5 to 1,000; and $x+y=1$.

The present invention still further provides a copolymerized polymeric liquid-crystalline compound comprising a main chain having a repeating unit represented by the following formula (IIIa), a liquid-crystal composition comprising such a compound, and a liquid-crystal device comprising such a liquid-crystal composition.

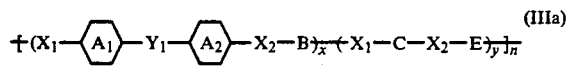 (IIIa)

wherein

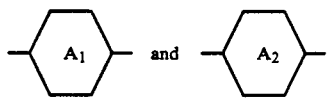

are each selected from any one of

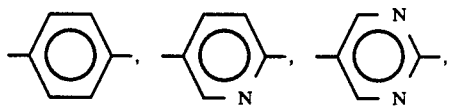

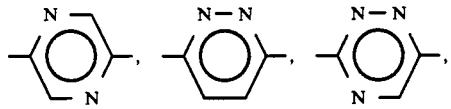

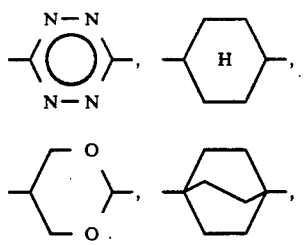

provided that at least one of

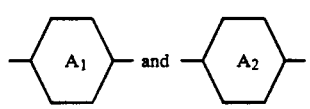

represents 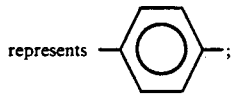;

$Y_1$ represents any one of a single bond, —CH=CH—, —C≡C—, —N=N—,

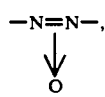

—CH=N—, —CH₂CH₂— and —CH₂O—; B represents a flexible group represented by the formula

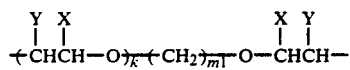

wherein X represents a hydrogen atom or a methyl group and Y represents a hydrogen atom or a methyl group, provided that X is not the same as Y, k is 0 or 1, and m1 is 1 to 18,
or

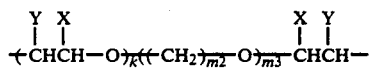

wherein X represents a hydrogen atom or a methyl group and Y represents a hydrogen atom or a methyl group, provided that X is not the same as Y, k is 0 or 1, m2 is 2 to 10 and m3 is 2 to 5;
C represents a mesogen group which may be the same as or different from

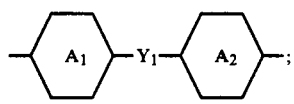

E represents a flexible group containing no optically active group; $X_1$ and $X_2$ each represent a group containing any one of an ester bond, an ether bond and a carbonate bond, and may be the same or different from each other; n represents 5 to 1,000; x+y=1; and the homopolymer having a repeating unit of the polymeric liquid crystal represented by

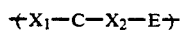

in the formula renders a smectic C phase.

DESCRIPTION OF THE PREFERRED EMBODIMENTS

Figure 1:
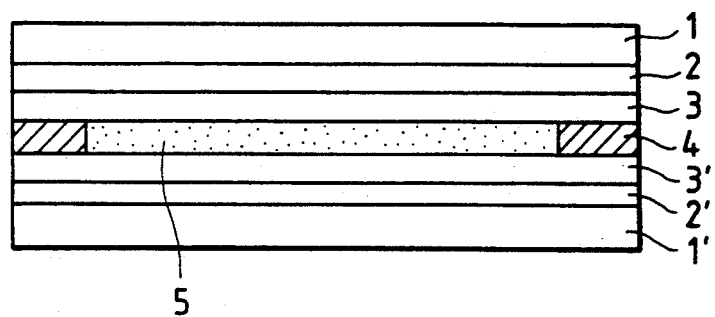
FIG. 1 is a cross-sectional view of a liquid-crystal device used in Example 4.

The present invention will be described below in detail.

In the polymeric liquid-crystalline compound of the present invention, the letters symbol A in the repeating unit represented by the above formula (I), (II) or (III) represents a bicyclic mesogen group. Preferred examples thereof are the following:

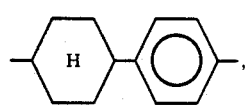

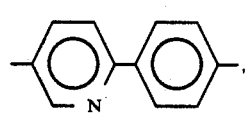

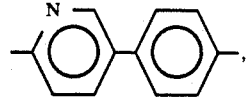

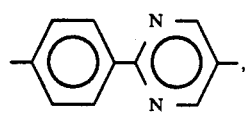

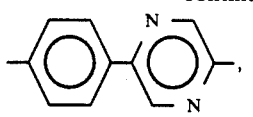

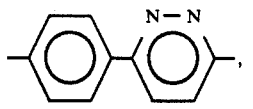

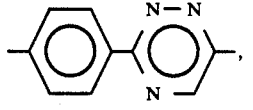

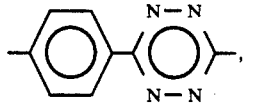

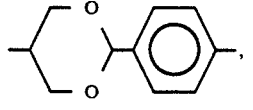

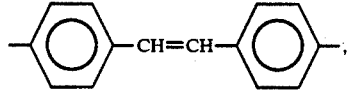

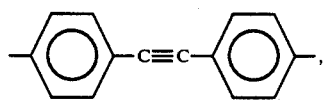

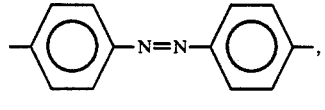

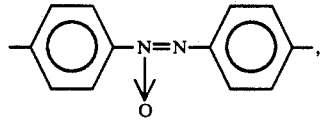

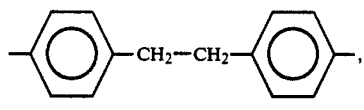

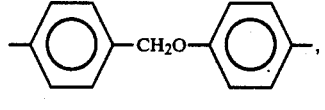

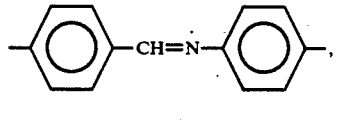

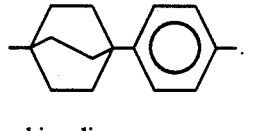

The bicyclic mesogen group used in the present invention gives a lower liquid crystal temperature range and hence can be used with ease from the viewpoint of practical use, compared with polycyclic types of three or more ring structures, when the formation of a liquid crystal phase is taken into account. In addition, since the above polycyclic types tend to result in a complicated liquid-crystal phase transition pattern, the molecular structure can be controlled relatively with difficulty in order for a liquid crystal to render a chiral smectic phase. The bicyclic type is preferred also in this respect. $X_1$ and $X_2$ each represent a group containing any one of an ester bond, an ether bond and a carbonate bond, and may be the same or different from each other. Of these, the polyester represented by the following formula (IV) is particularly preferred since it can readily give a high-molecular weight material and can have a chiral smectic phase with ease.

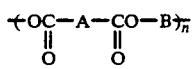  (IV)

The group B is represented by

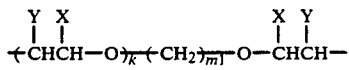

wherein X represents a hydrogen atom or a methyl group and Y represents a hydrogen atom or a methyl group, porvided that X is not the same as Y, k is 0 or 1, and m1 is 1 to 18, or

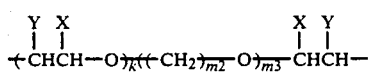

wherein X represents a hydrogen atom or a methyl group and Y represents a hydrogen atom or a methyl group, provided that X is not the same as Y, k is 0 or 1, m2 is 2 to 10 and m3 is 2 to 5, and is a flexible group derived from an optically active lactic acid.

Preferred examples are as shown below;

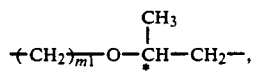

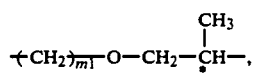

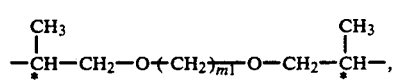

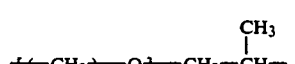

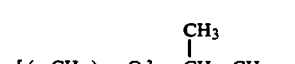

-continued

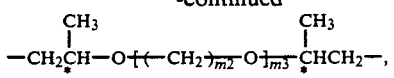

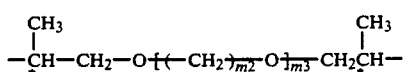

(The asterisk * represents an optically active group).

These groups can be derived from diols. Methods of synthesizing these are described in Japanese Patent Application Laid-Open No. 1-93553.

The optically active flexible group used in the present invention comprises an asymmetric carbon atom to which an oxygen atom having a polarity is directly bonded, hence a large spontaneous polarization. This is preferable in view of response speed. The optically active flexible group is also rich in flexibility because of its ether bond, hence a high liquid crystallinity that is, bringing about a broad temperature range for the formation of a liquid cyrstal phase.

The letter symbol C represents a mesogen group which may be the same as or different from the group represented by A. A mesogen group has a skeletal structure containing two or more cyclic groups and comprised of a cyclic group positioned at each end. In particular, it may preferably be selected from the bicyclic mesogen groups as exemplified above, and may also preferably be so selected as to be the same as the group A in view of the reactivity required when the mesogen group is introduced.

The letter symbol D represents a group represented by the same formula as B but with a different molecular structure or represents a different flexible group. A flexible group refers to a skeletal moiety, positioned between mesogen groups, from which the bonding group bonded to the mesogen groups is excluded and which is a straight-chain or branched chain group containing no cyclic group.

The letter symbol E represents a flexible group containing no optically active group.

Preferred examples of the group D other than or different from the group B are straight-chain alkyl groups as exemplified by

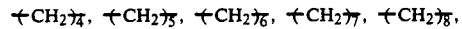

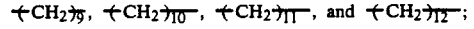

and alkyl groups having a branch, as exemplified by the following:

   m = 2 to 17,

   m = 2 to 17,

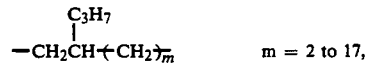   m = 2 to 17,

   m = 3 to 18,

-continued

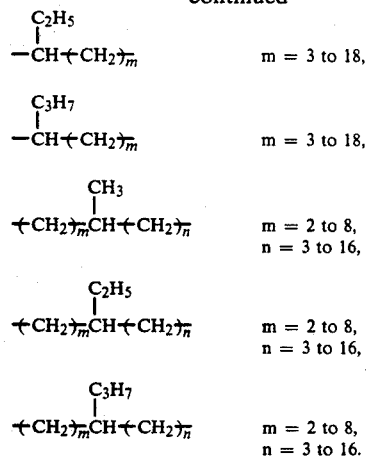

The above examples of the alkyl group having a branch may also apply to the above group E.

In the present invention, the polymeric liquid-crystalline compound into which the ester bond having a repeating unit represented by the formula (II) has been introduced can be synthesized by molten polymerization or solution polymerization which is a usual polycondensation reaction.

In the molten polymerization, for example, the compound is synthesized by ester exchange reaction between a dialkyl ester of dicarboxylic acid and a diol containing an optically acitve group. In order to smoothly carry out the reaction, it is preferred to add a known esterification catalyst as exemplified by an organic titanium compound such as a tetra-n-propyl ester, a tetra-isopropyl ester or a tetra-n-butyl ester of titanic acid, an organic tin compound, antimony trioxide, or an acetate of lead, zinc, manganese, calcium or the like.

In the solution polymerization, for example, a condensation reaction by dehydrohalogenation between an acid halide containing a mesogen group and a diol containing an optically active group may be used.

In the present invention, in order to control temperature characteristics, optical characteristics, electrical characteristics and so forth, it is also preferred to use as the polymeric liquid-crystalline compound a combination of two or more of the group A or B in the formula (I).

The polymeric liquid-crystalline compound or copolymerized polymeric liquid-crystalline compound obtained through the present reaction may be purified by a usual method such as reprecipitation or filtration, and then used as it is or optionally after purified by subjecting to a chromatography.

The polymeric liquid-crystalline compound or copolymerized polymeric liquid-crystalline compound of the present invention may have a degree of polymerization of from 5 to 1,000, and a weight average molecular weight (Mw) of from 2,000 to 500,000, and preferably from 5,000 to 100,000.

Examples of the polymeric liquid-crystalline compound or copolymerized polymeric liquid-crystalline compound of the present invention having the repeating unit represented by the formulas (I), (II) and (III) are given below, which, however, are not limited to these.

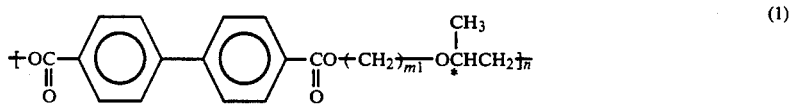

(1)

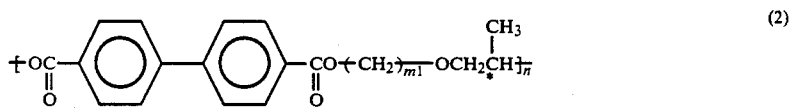

(2)

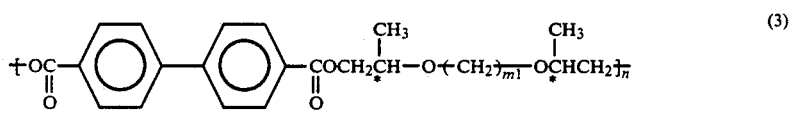

(3)

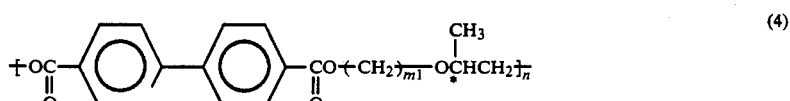

(4)

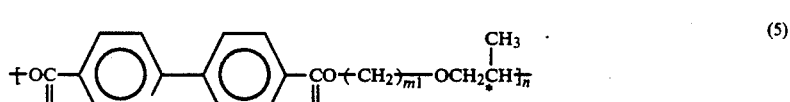

(5)

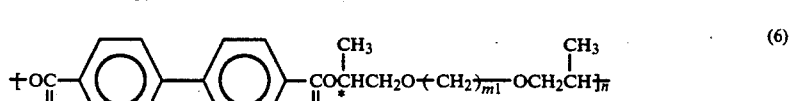

(6)

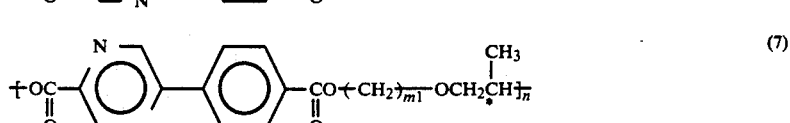

(7)

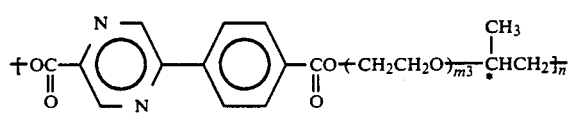
(8)
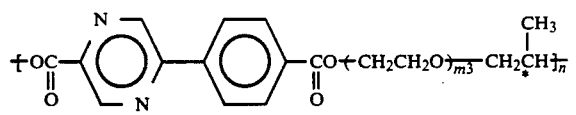
(9)
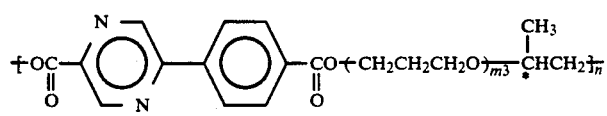
(10)
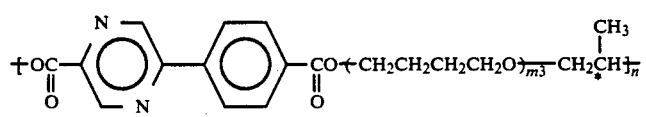
(11)
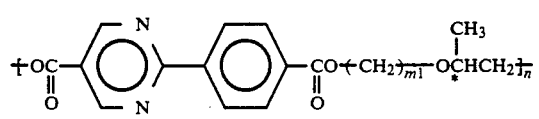
(12)
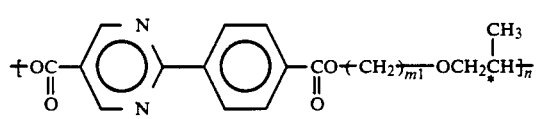
(13)
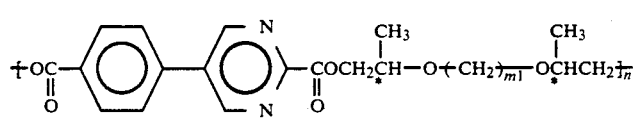
(14)
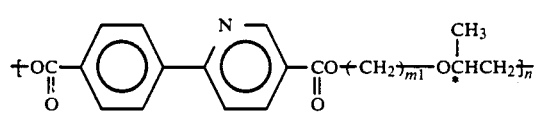
(15)
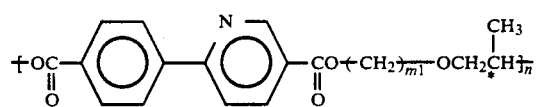
(16)
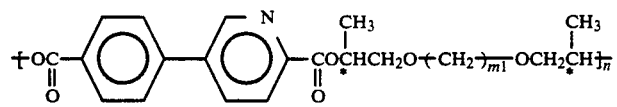
(17)
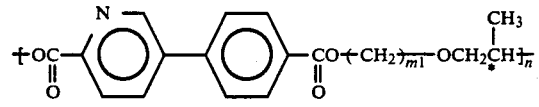
(18)
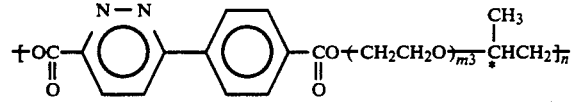
(19)
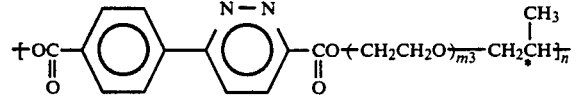
(20)

-continued
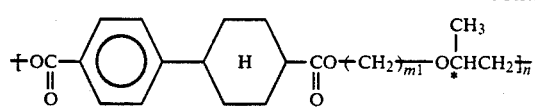 (21)
 (22)
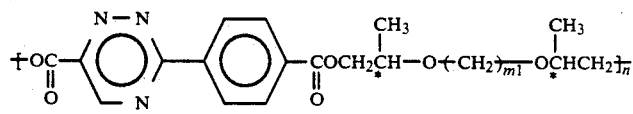 (23)
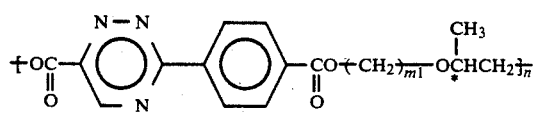 (24)
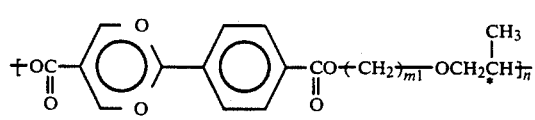 (25)
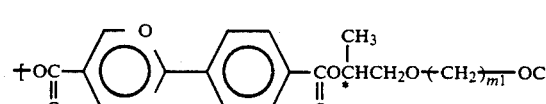 (26)
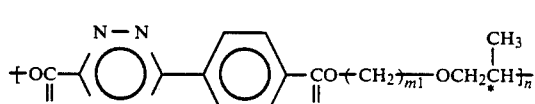 (27)
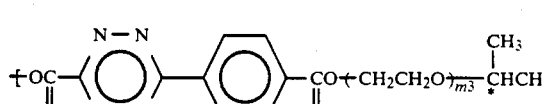 (28)
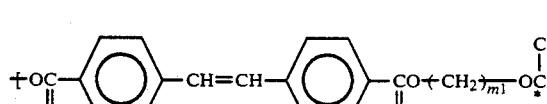 (29)
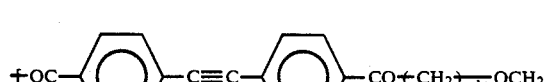 (30)
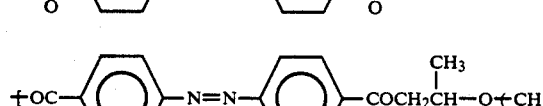 (31)
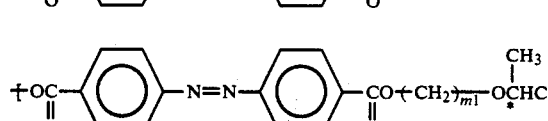 (32)
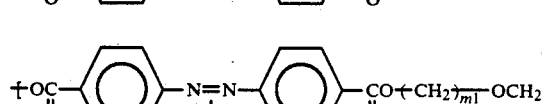 (33)
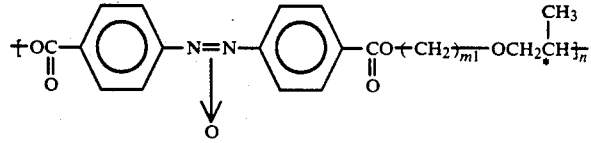

-continued
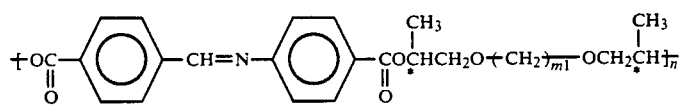 (34)
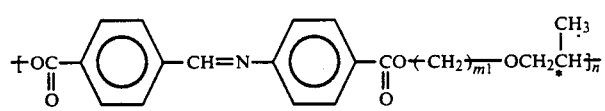 (35)
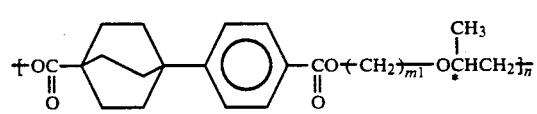 (36)
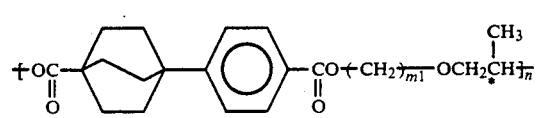 (37)
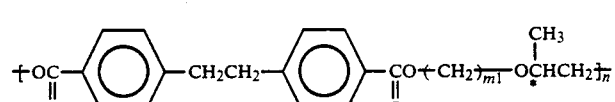 (38)
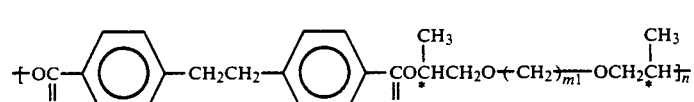 (39)
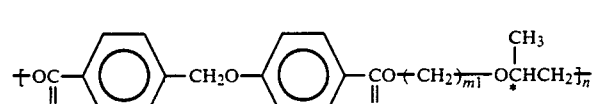 (40)
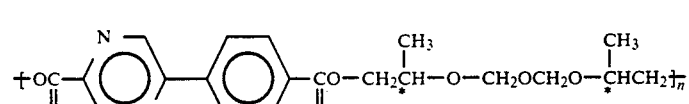 (41)
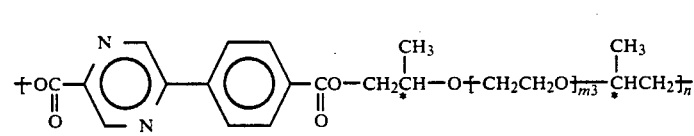 (42)
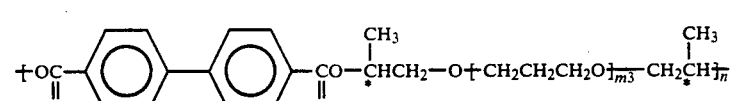 (43)
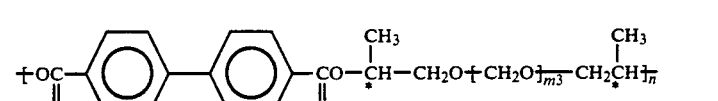 (44)
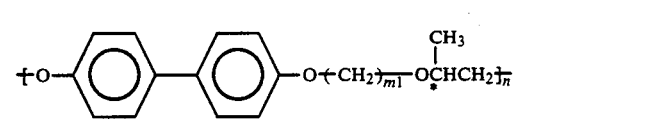 (45)
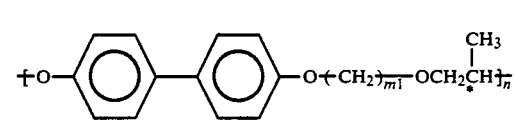 (46)

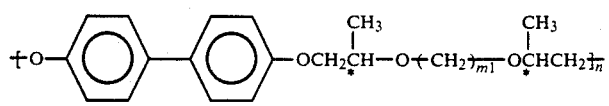 (47)
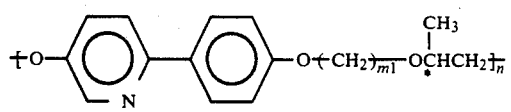 (48)
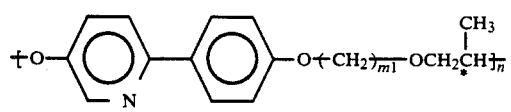 (49)
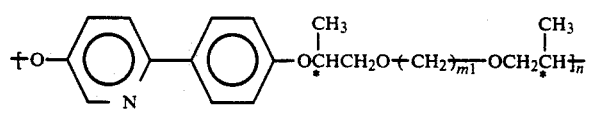 (50)
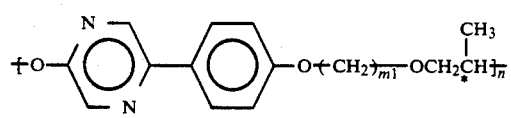 (51)
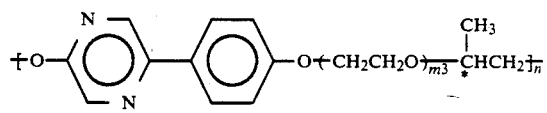 (52)
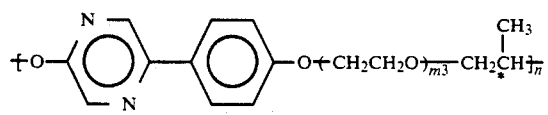 (53)
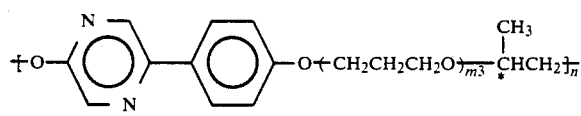 (54)
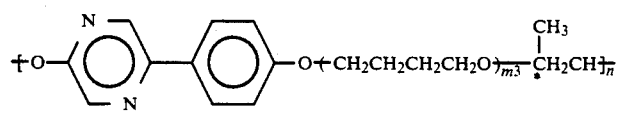 (55)
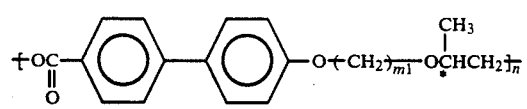 (56)
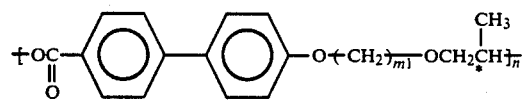 (57)
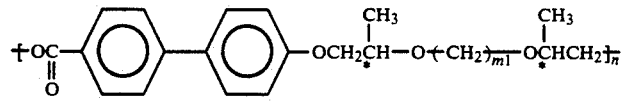 (58)
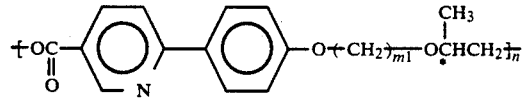 (59)

-continued
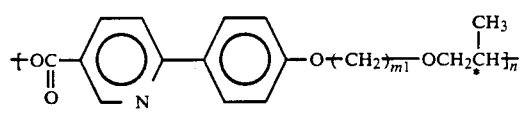 (60)
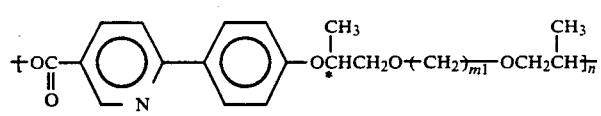 (61)
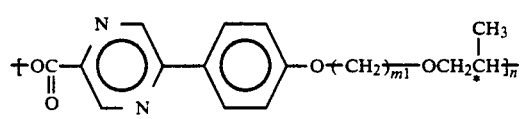 (62)
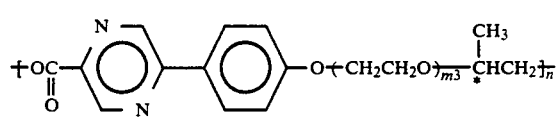 (63)
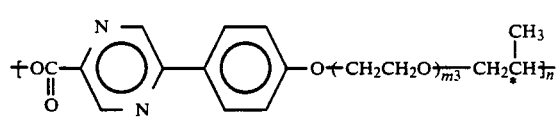 (64)
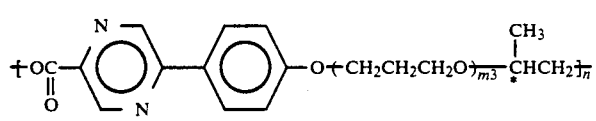 (65)
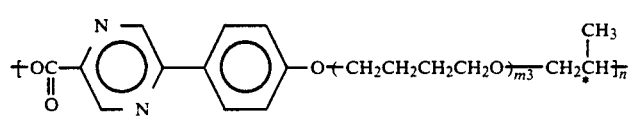 (66)
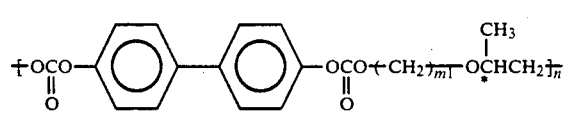 (67)
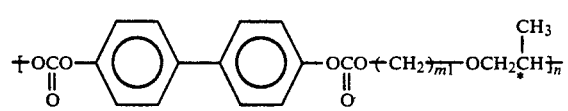 (68)
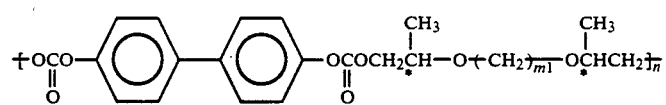 (69)
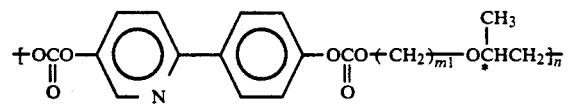 (70)
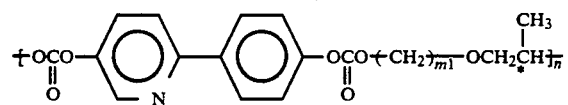 (71)
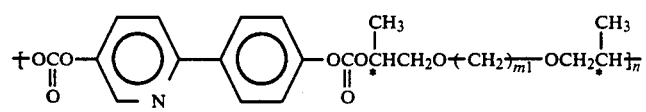 (72)

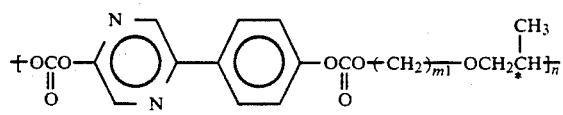 (73)
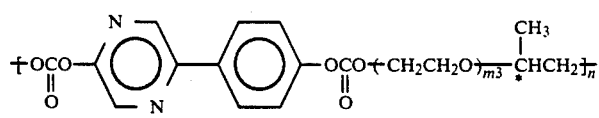 (74)
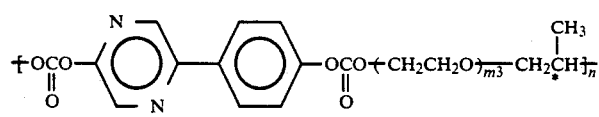 (75)
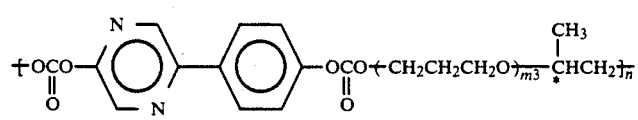 (76)
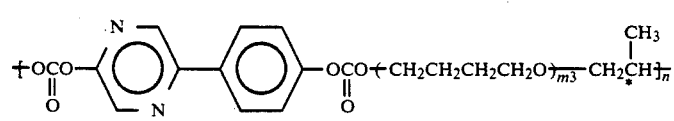 (77)
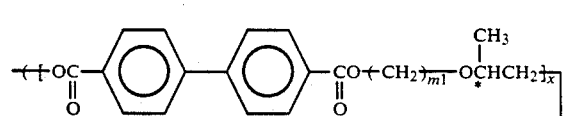 (78)
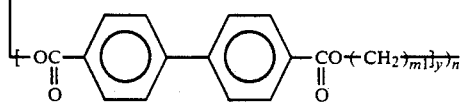
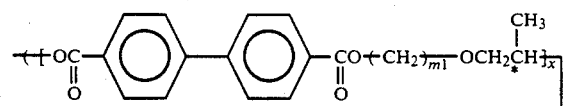 (79)
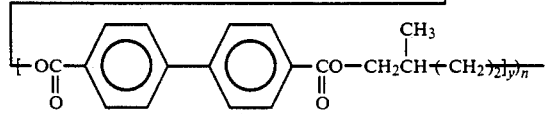
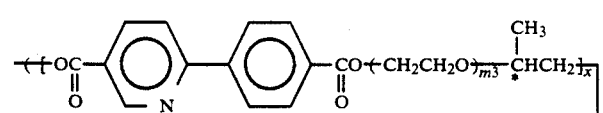 (80)
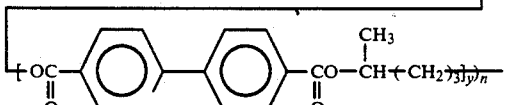
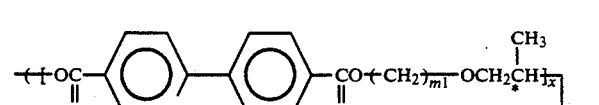 (81)
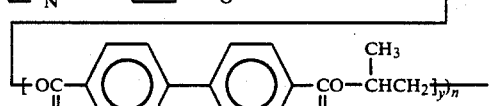

-continued
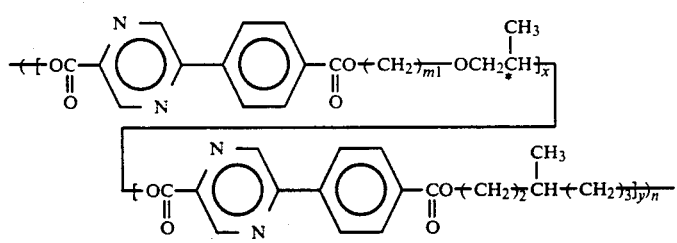 (82)
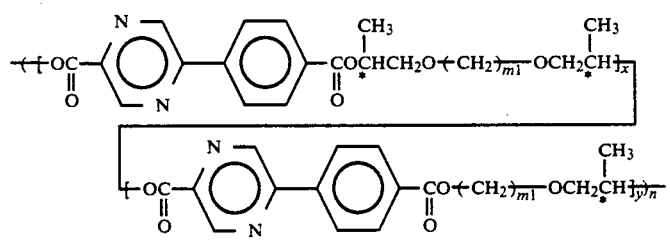 (83)
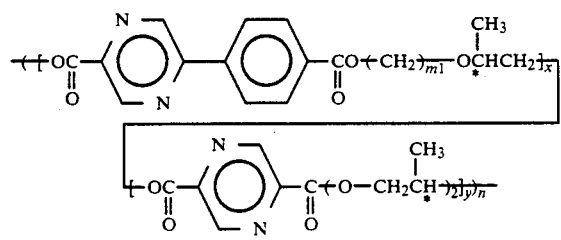 (84)
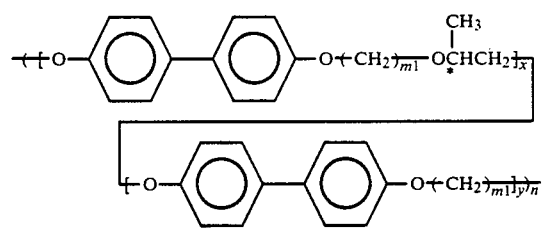 (85)
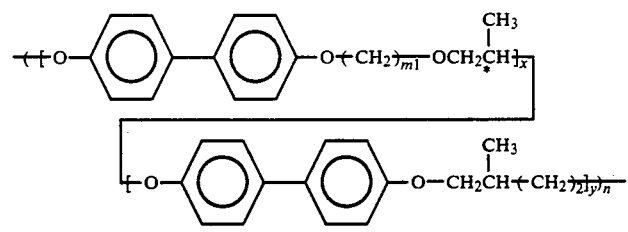 (86)
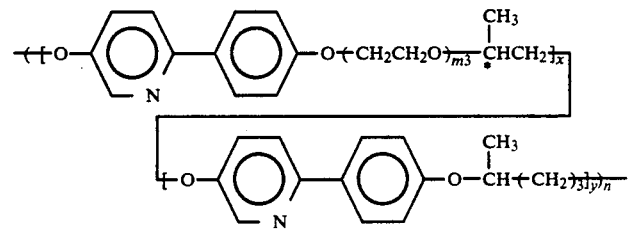 (87)

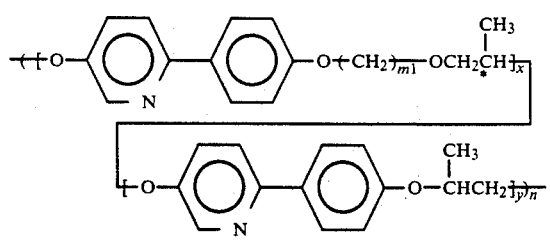
(88)
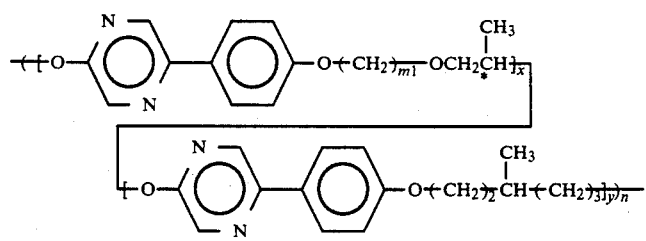
(89)
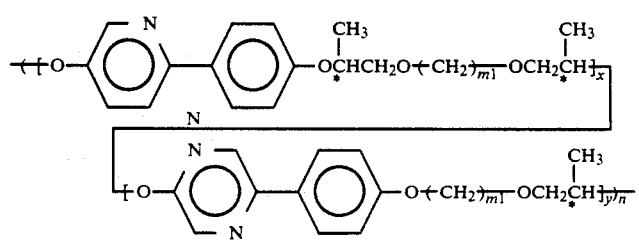
(90)
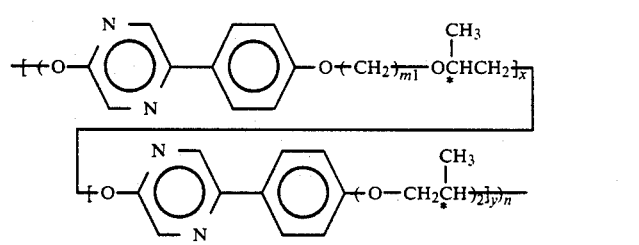
(91)
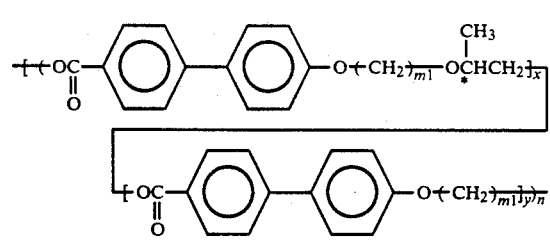
(92)
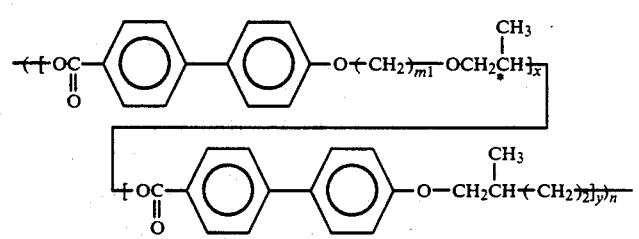
(93)

-continued
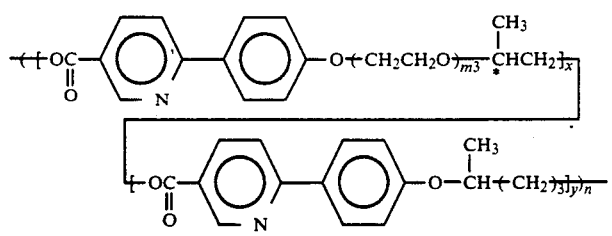 (94)
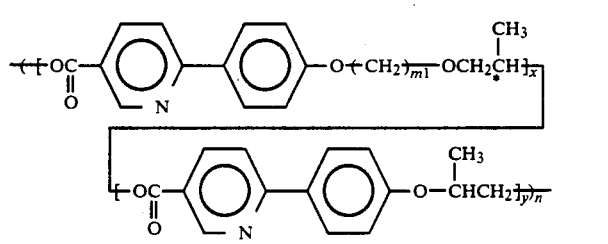 (95)
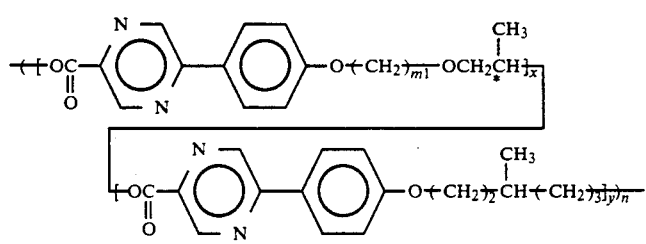 (96)
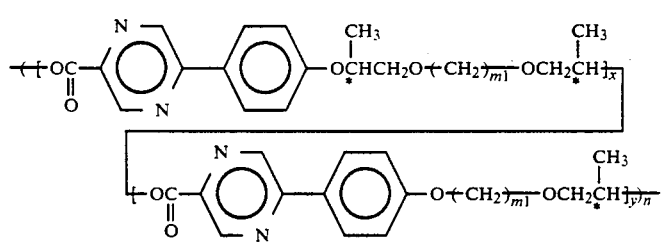 (97)
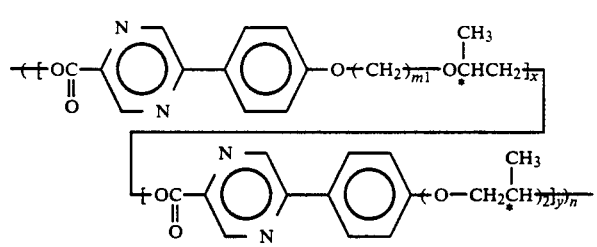 (98)
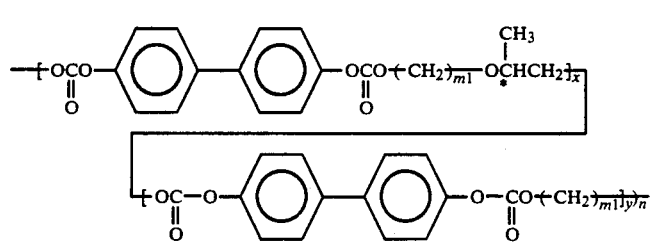 (99)

-continued

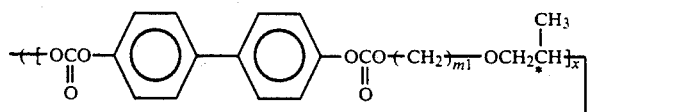 (100)

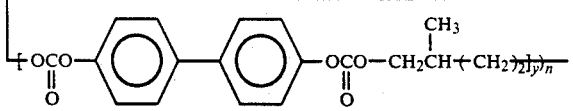

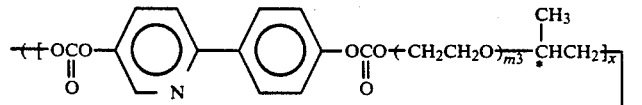 (101)

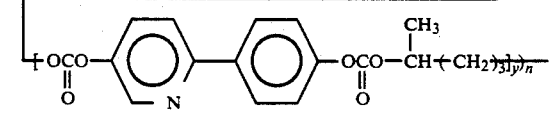

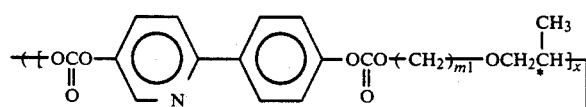 (102)

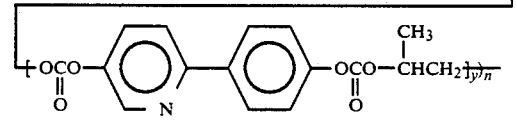

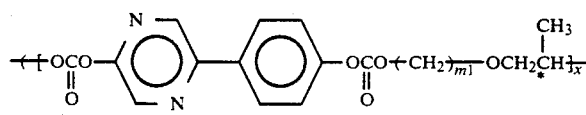 (103)

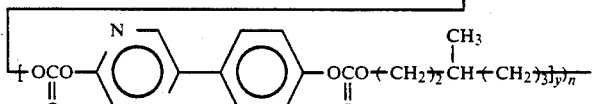

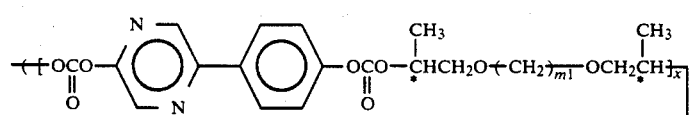 (104)

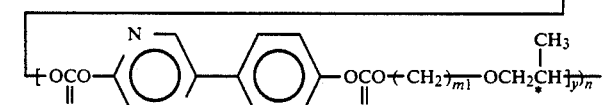

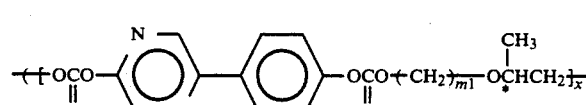 (105)

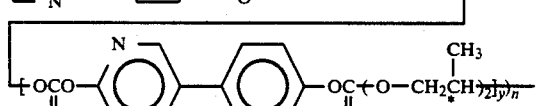

(m1 = 1 to 18, m3 = 2 to 5, x + y = 1, n = 5 to 1,000).

Of these, particularly preferred is a compound that renders a chiral smectic phase, like the copolymerized polymeric liquid-crystalline compound of a polymeric liquid crystal comprising a homopolymer the renders the smectic-C phase and a polymeric liquid crystal having a repeating unit containing an optically active group (for example, Nos. 79, 80, . . . ).

In the copolymerized polymeric liquid-crystalline compound of the present invention, the flexible chain represented by B is held in an amount of not less than 1 mol %, and preferably not less than 10 mol %, based on the total flexible chains. An amount less than 1 mol % may result in a difficulty for the compound to render a chiral smectic phase.

Referring next to the liquid-crystal composition of the present invention, it comprises the polymeric liquid-crystalline compound and/or the copolymerized polymeric liquid-crystalline compound, described above, and, for example, a low-molecular liquid crystal. There are no particular limitations on the low-molecular liquid crystal so long as it has a good compatibility with the polymeric liquid-crystalline compound and copolymerized polymeric liquid-crystalline compound.

The low-molecular liquid crystal may be used alone, or a mixture of two or more kinds may be used.

Preferred examples thereof are optically active low-molecular liquid crystals as shown by the following formulas (1) to (15) or low-molecular liquid crystals not optically active as shown by the following formulas (16) to (35). In view of response performance, it is preferred to use the former.

In the following, "Cryst." refers to "Crystal phase", "Iso" to "Isotropic phase" and "Cholest." to "Cholesteric phase".

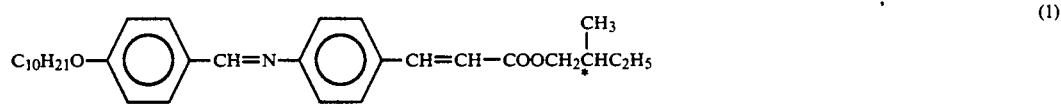

(1)

p-Decyloxybenzylidene-p'-amino-2-methylbutyl cinnamate (DOBAMBC)

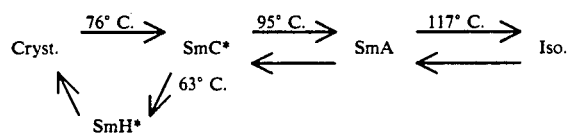

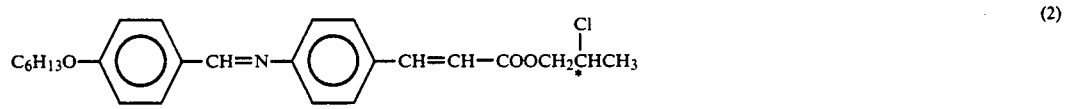

(2)

p-Hexyloxybenzylidene-p'-amino-2-chloropropyl cinnamate (HOBACPC)

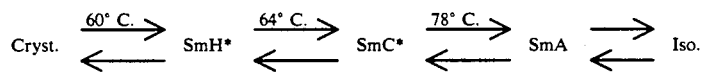

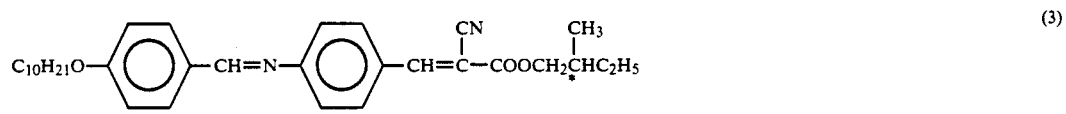

(3)

p-Decyloxybenzylidene-p'-amino-2-methylbutyl-α-cyanocinnamate (DOBAMBCC)

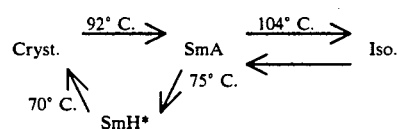

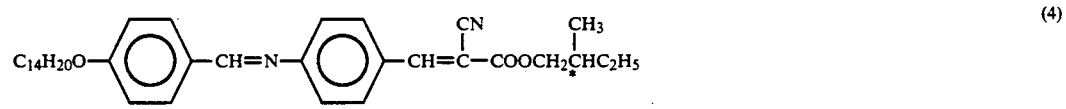

(4)

p-Tetradecyloxybenzylidene-p'-amino-2-methylbutyl-α-cyanocinnamate (TDOBAMBCC)

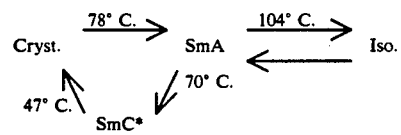

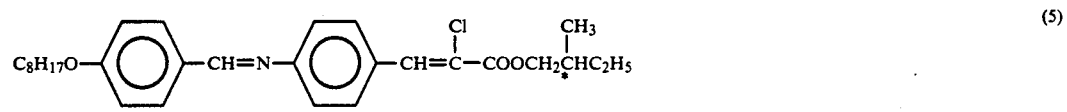

(5)

p-Octyloxybenzylidene-p'-amino-2-methylbutyl-α-chlorocinnamate (OOBAMBCC)

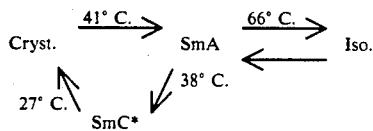
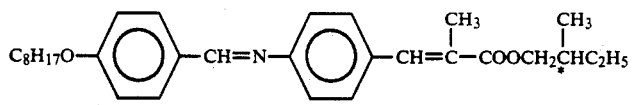 (6)
p-Octyloxybenzylidene-p'-amino-2-methylbutyl-α-methylcinnamate
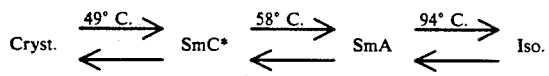
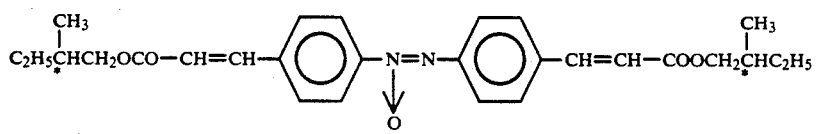 (7)
4,4'-Azoxycinnamic acid-bis(2-methylbutyl) ester
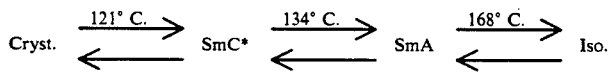
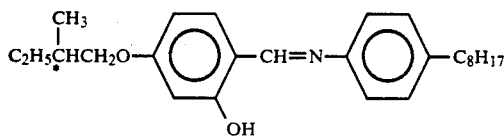 (8)
4-o-(2-Methyl)-butylresorcylidene-4'-octylaniline (MBRA 8)
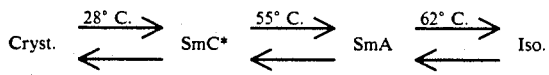
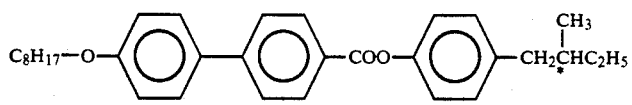 (9)
4-(2'-Methylbutyl)phenyl-4'-octyloxybiphenyl-4-carboxylate
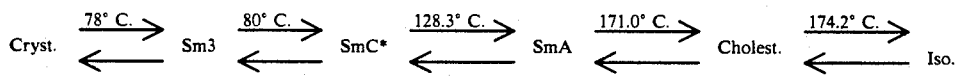
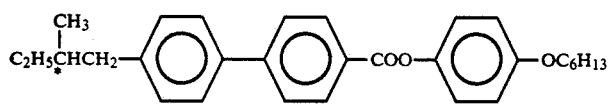 (10)
4-Hexyloxyphenyl-4-(2''-methylbutyl)biphenyl-4'-carboxylate
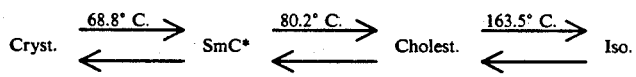
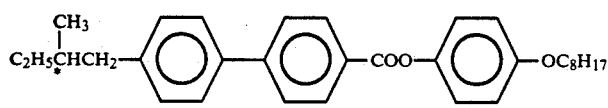 (11)
4-Octyloxyphenyl-4-(2''-methylbutyl)biphenyl-4'-carboxylate -continued
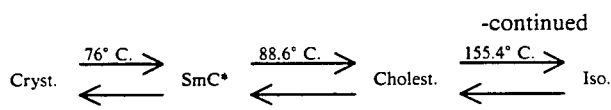
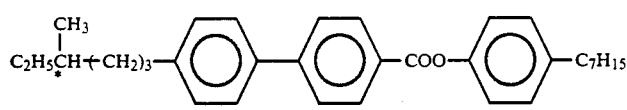 (12)
4-Hexyloxyphenyl-4-(2''-methylbutyl)biphenyl-4'-carboxylate
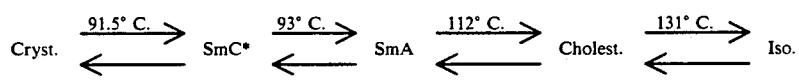
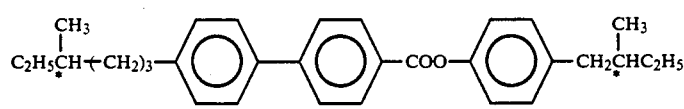 (13)
4-(2''-methylbutyl)phenyl-4-(4''-methylhexyl)biphenyl-4'-carboxylate
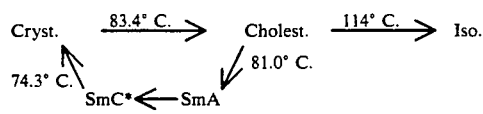
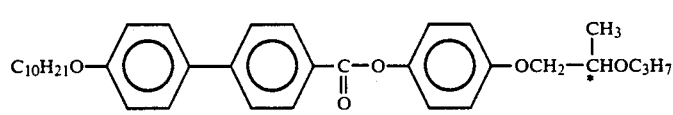 (14)
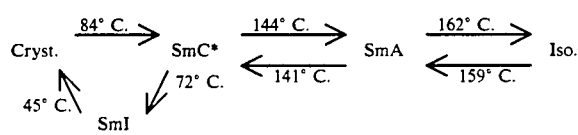
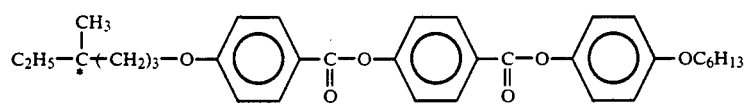 (15)
Examples of liquid crystal compounds that render non-chiral smectic phase:
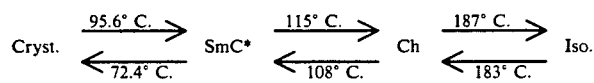 (16)
4'-n-Nonyloxy-4-biphenylyl-4-cyanobenzoate
Iso. ⟶ Nematic ⟶ Smectic C
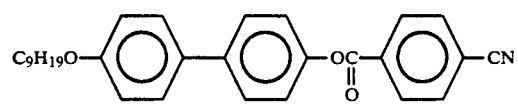 (17)
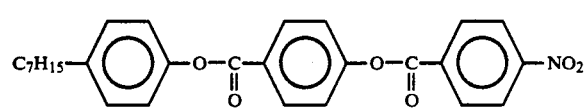
4-n-Heptylphenyl-4-(4'-nitrobenzoyloxy)benzoate (DB7NO2)
Iso. ⟶ Nematic ⟶ Smectic A -continued

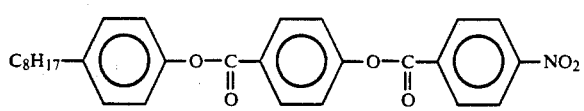

(18)

4-n-Octylphenyl-4-(4'-nitrobenzoyloxy)benzoate (DB₈NO₂)

Iso. ⟶ Nematic ⟶ Smectic A ⟶ Smectic C

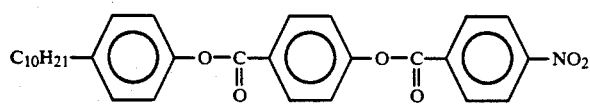

(19)

4-n-Decylphenyl-4-(4'-nitrobenzoyloxy)benzoate (DB₁₀NO₂)

Iso. ⟶ Nematic ⟶ Smectic A ⟶ Smectic C

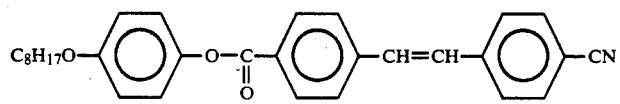

(20)

trans-4-(4"-Octyloxybenzoyloxy)-4'-cyanostilbene (T8)

Iso. ⟶ Nematic ⟶ Smectic A1 ⟶ Nematic ⟶ Smectic A2

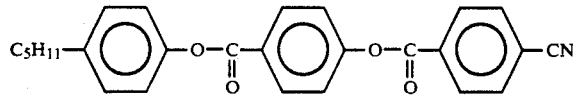

(21)

4-n-Pentylphenyl-4-(4'-cyanobenzoyloxy)benzoate (DB₅CN)

Iso. ⟶ Nematic ⟶ Smectic A

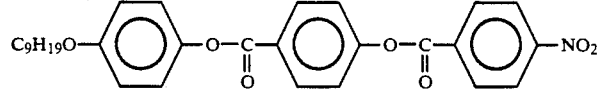

(22)

4-n-Nonyloxyphenyl-4-(4'-nitrobenzoyloxy)benzoate (DB₉ONO₂)

Iso. ⟶ Nematic ⟶ Smectic A ⟶ Smectic C

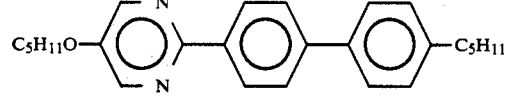

(23)

2-(4'-n-Pentylphenyl)-5-(4"-n-pentyloxyphenyl)pyrimidine

Iso. ⟶ Smectic A ⟶ Smectic C ⟶ Smectic F ⟶ Smectic G

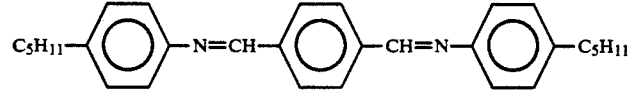

(24)

Terephthalylidene-bis-4-n-pentylaniline (TBPA)

Iso. ⟶ Nematic ⟶ Smectic A ⟶ Smectic C ⟶ Smectic F ⟶ Smectic G ⟶ Smectic H

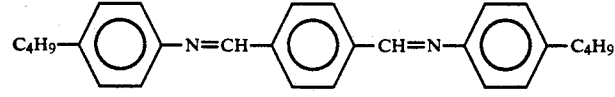

(25)

N-terephthalylidene-bis-4-n-butylaniline (TBBA)

Iso. ⟶ Nematic ⟶ Smectic A ⟶ Smectic C ⟶ Smectic G ⟶ Smectic H (26)

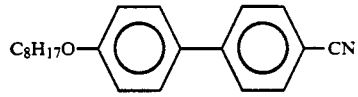

4-Cyano-4'-n-octyloxybiphenyl (8OCB)

Iso. ⟶ Nematic ⟶ Smectic A (27)

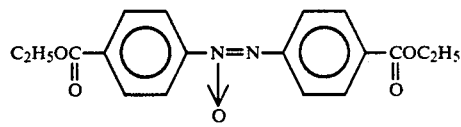

Ethyl-4-azobenzoate

Iso. ⟶ Smectic A (28)

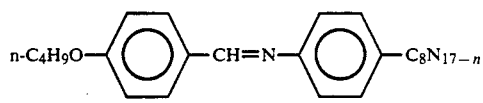

N-(4'-n-butyloxybenzylidene)-4-n-octylaniline (408)

Iso. ⟶ Smectic A ⟶ Smectic B (29)

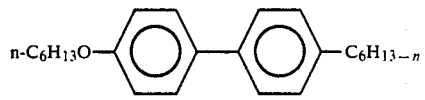

4-n-Hexyl-4'-n-hexyloxybiphenyl

Iso. ⟶ Smectic B ⟶ Smectic E (30)

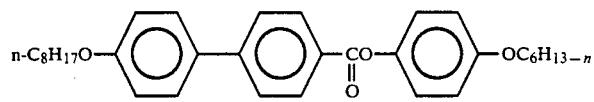

4-n-Hexyloxyphenyl-4'-n-octyloxybiphenyl-4-carboxylate

Iso. ⟶ Nematic ⟶ Smectic A ⟶ Smectic C ⟶ Smectic B (31)

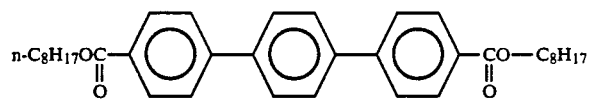

Di-n-Octyl-4',4''-terphenyldicarboxylate

Iso. ⟶ Smectic A ⟶ Smectic C (32)

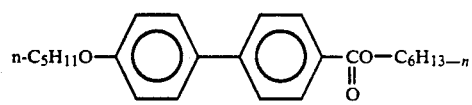

n-Hexyl-4'-n-pentyloxybiphenyl-4-carboxylate (65OBC)

Iso. ⟶ Smectic A ⟶ Smectic B ⟶ Smectic E (33)

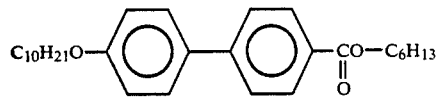

4-n-Hexyl-4'-n-decyloxybiphenyl-4-carboxylate

Iso. ⟶ Smectic A ⟶ Smectic C (34)

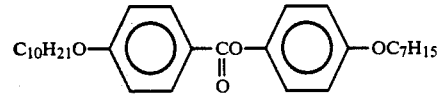

4-n-Heptyloxyphenyl-4-n-decyoxybenzoate

Iso. ⟶ Smectic A ⟶ Smectic C (35)

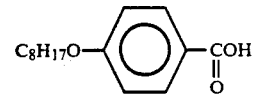

4-n-Octyloxybenzoic acid

Iso. ⟶ Nematic ⟶ Smectic C

Into the liquid-crystal composition of the present invention, other low-molecular compound, polymeric compound and polymeric liquid-crystalline compound can also be mixed. Namely, those which do not cause the chiral smectic phase to disappear and have good compatibility may be appropriately selected and use. For example, polymeric liquid-crystalline compounds that can be additionally used in combination may include the following:

In the following formulas (36) to (48), $15 \geq p \geq 1$.

(36)

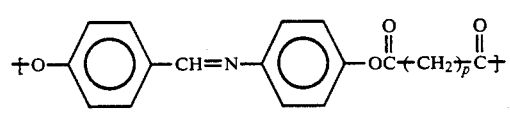

(37)

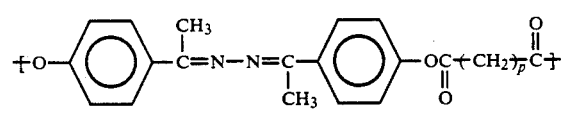

(38)

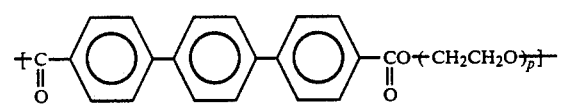

(39)

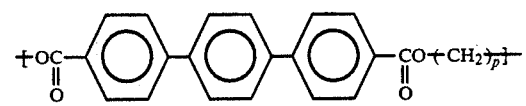

(40)

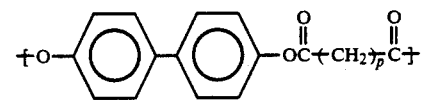

(41)

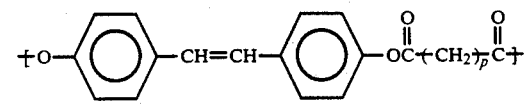

-continued

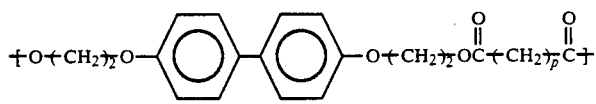 (42)

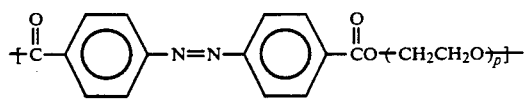 (43)

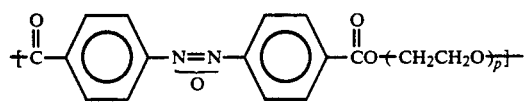 (44)

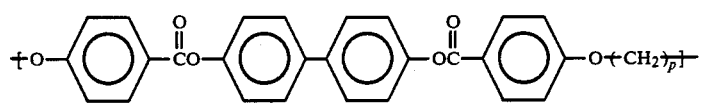 (45)

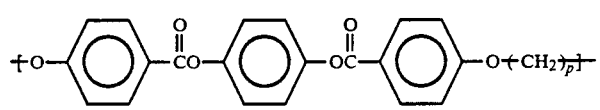 (46)

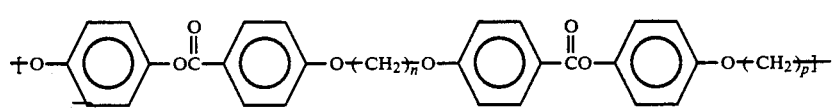 (47)

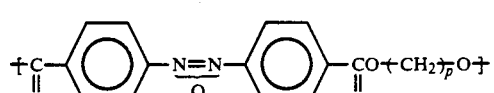 (48)

In the liquid-crystal composition containing the polymeric liquid-crystalline compound or copolymerized polymeric liquid-crystalline compound, the polymeric liquid-crystalline compound or copolymerized polymeric liquid-crystalline compound should be contained in an amount of not less than 5% by weight, and preferably not less than 10% by weight. An amount less than 5% by weight may result in a lowering of the alignment stability to pressure, thermal stimulation, etc., which is attributable to the anisotropy of the polymeric liquid-crystalline compound. When the composition is used in the form of a film, the polymeric liquid-crystalline compound should be contained in an amount of not less than 30% by weight, and preferably not less than 50% by weight, in view of form retention.

From the requirement for device designing, it is preferred to use the above polymeric liquid-crystalline compound and copolymerized polymeric liquid-crystalline compound together with other polymers. polymeric liquid crystals, low-molecular compounds or low-molecular liquid crystals, in combination of their respectively plural kinds, so that the temperature characteristics, optical characteristics, electrical characteristics, etc. can be readily controlled.

To the liquid-crystal composition according to the present invention, it is possible to add coloring matters, light stabilizers, light absorbents, antioxidants, plasticizers, etc.

Referring next to the liquid-crystal device of the present invention, it comprises a substrate and, provided thereon, a film comprising the polymeric liquid-crystalline compound or copolymerized polymeric liquid-crystalline compound as previously described, comprising a main chain having the repeating unit represented by the following formula:

$$X_1—A—X_2—B$$

or the liquid-crystal composition containing these polymeric liquid-crystalline compounds.

As a specific constitution of the liquid-crystal device of the present invention, the polymeric liquid-crystalline compound, the copolymerized polymeric liquid-crystalline compound or the polymeric liquid-crystal composition may be formed into a thin film from its molten state and the film thus formed may be inserted and adhered between substrates provided with electrodes. When the film is adhered, a suitable spacer may be provided between the film comprising the polymeric liquid-crystalline compound, copolymerized polymeric liquid-crystalline compound or polymeric liquid-crystal composition and the electrodes so that the insulation between the electrodes can be kept. Alternatively, without the substrates, electrodes may be directly provided on the film comprising the polymeric liquid-crystalline compound, copolymerized polymeric liquid-crystalline compound or polymeric liquid-crystal composition. In this embodiment, a flexible liquid-crystal device in the form of film can be obtained.

The film comprising the polymeric liquid-crystalline compound, copolymerized polymeric liquid-crystalline compound or polymeric liquid-crystal composition can also be formed by dissolving the polymeric liquid-crystalline compound, copolymerized polymeric liquid-crystalline compound or polymeric liquid-crystal composition in a solvent such as dichloroethane, THF, cyclohexanone or chloroform to bring it into a solution and then into a film.

More specifically, as a method of forming the film, it is possible to apply methods for making usual plastic films, i.e., melt extrusion, casting from solution, calendering or spin coating.

According to the present invention, when a liquid crystal phase is formed in the liquid-crystal device, the above polymeric liquid-crystalline compound, copolymerized polymeric liquid-crystalline compound or polymeric liquid-crystal composition may be formed into a film and then the film may be subjected to a stretching alignment treatment, so that liquid-crystal molecules can be aligned in a high performance.

As methods for the stretching alignment treatment, monoaxial stretching or the like can be applied. Alternatively, a plastic substrate serving as a support may be coated with a solution comprising the polymeric liquid-crystalline compound, copolymerized polymeric liquid-crystalline compound or polymeric liquid-crystal composition to laminate a film comprising the polymeric liquid-crystalline compound, copolymerized polymeric liquid-crystalline compound or polymeric liquid-crystal composition, and then the resulting laminate as a whole may be stretched. Still alternatively, a cell in which a liquid-crystal film is held between a pair of substrates may be formed and then the film may be aligned by stretching.

The liquid-crystal device of the present invention may also comprise a pair of substrates having been subjected to alignment treatment, between which the polymeric liquid-crystalline compound, copolymerized polymeric liquid-crystalline compound or polymeric liquid-crystal composition is sealed in a molten state kept at a temperature higher than the isotropic phase transition temperature.

As the alignment treatment for the substrates, it is possible to apply a method in which an organic thin film made of polyimide, polyamide, polyvinyl alcohol, polysiloxane, polyimide amide or the like is monoaxially or biaxially aligned by rubbing, a method in which an inorganic film made of $SiO_2$, ZnS, MgO or the like is monoaxially or biaxially aligned by rubbing, or a method to use a surface obtained by oblique vacuum deposition of an inorganic compound such as $SiO_2$, SiO, MgO or $MgF_2$.

In the embodiment in which the polymeric liquid-crystalline compound, copolymerized polymeric liquid-crystalline compound or polymeric liquid-crystal composition is held between a pair of substrates, a good alignment can also be obtained by shearing, which is carried out by minutely slipping the upper and lower substrates.

The constitution of the liquid-crystal device of the present invention may vary depending on various uses. An example of the construction commonly used will be described herein.

Figure 2:
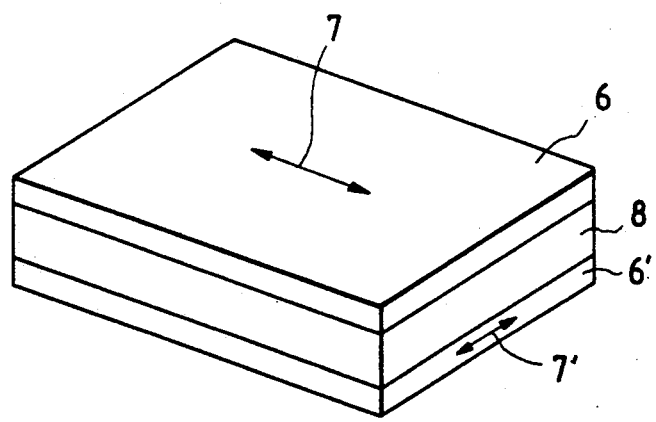
FIG. 2 is a oblique view of a liquid-crystal device provided with a polarizing plate, used in Example 4.
Figure 4:
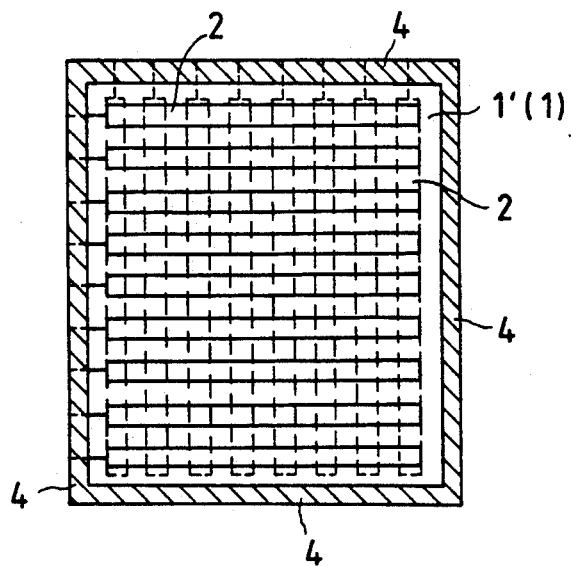
FIG. 4 is a plane view of a liquid-crystal device in which transparent electrodes are disposed in the form of a matrix.
Figure 5:
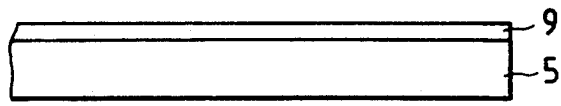
FIGS. 5 to 7 are cross-sectional views of liquid-crystal devices.
Figure 6:
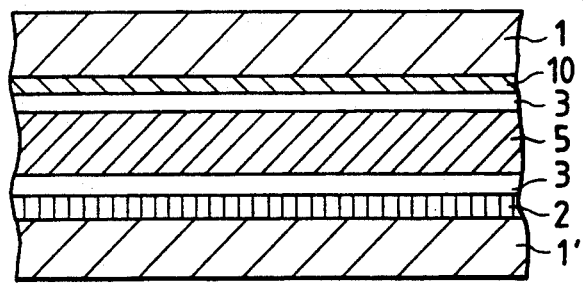
Figure 7:
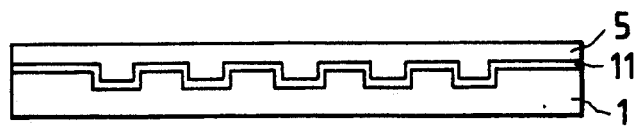

FIG. 1 is a cross-sectional view of a liquid-crystal device, FIG. 2 is a oblique view of a liquid-crystal device provided with a polarizing plate, FIG. 4 is a plane view of a liquid-crystal device in which transparent electrodes are disposed in the form of a matrix, and FIGS. 5 to 7 are cross-sectional views of liquid-crystal devices according to other embodiments.

In the drawings, reference numerals 1, 1' denote substrates; 2, 2', transparent electrodes; 3, 3' aligning layers; 4, an adhesive layer; 5, a polymeric liquid-crystal layer;

6, 6', polarizing plates; 7, 7', polarizing directions; 8, a liquid-crystal device; 9, a polyester film; 10, a reflective layer serving also as an electrode; and 11, an Al reflective layer.

Figure 8:
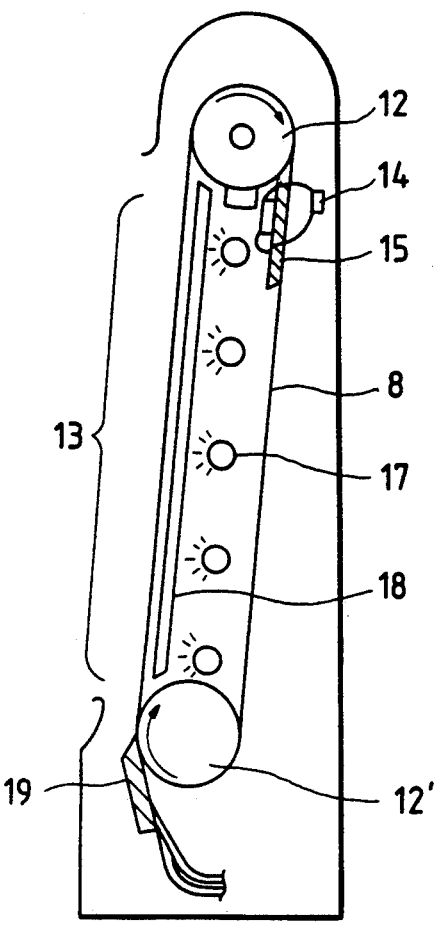
FIG. 8 illustrates the constitution of a display apparatus.
Figure 9:
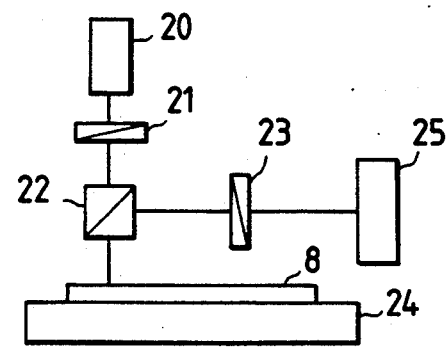
FIG. 9 illustrates the constitution of a recording apparatus.

Taking an example of the liquid-crystal device in the form of film from among the above respective liquid-crystal devices, FIG. 8 illustrates the construction of a display apparatus in which such a liquid-crystal device is used as a display device. FIG. 9 illustrates the construction of a recording apparatus in which each of the above liquid-crystal devices is used as a recording device. In these drawings, reference numerals 12, 12' denote rollers; 13, a display area; 14, a temperature sensor; 15, a flat heater; 16, a erasing means; 17, a light source; 18, a Fresnel lens; 19, a thermal head (a writing means); 20, a semiconductor laser; 21, a polarizer; 22, a beam splitter; 23, an analyzer; 24, a moving stage; and 25, a light-intensity detector.

The present invention will be described below in greater detail by giving examples.

EXAMPLE 1

To 3.0 g of diethyl-4,4'-biphenyl dicarboxylate and 2.6 g of a diol represented by the following formula, 0.0015 g of tetra-isopropyl titanate was added.

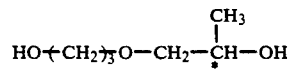

Under a nitrogen gas atmosphere, the temperature was raised to 150° C. by heating and reaction was carried out for 1 hour with stirring. Subsequently, the reaction was similarly carried out at 180° C. for 2 hours, and thereafter the temperature was raised to 230° C. in 1 hour. The reaction system was made to reduced pressure, under which the reaction was further carried out for 5 hours. Polymerization was completed at a degree of vacuum of 0.5 mmHg.

The polymer obtained from the reaction was dissolved in chloroform, and thereafter the solution was put in a 20-fold amount of methanol. The precipitate formed was filtered, followed by drying under a reduced pressure to give 2.5 g of a milk-white polymer (a).

Polymer (a):

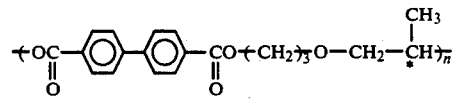

DSC measurement and polarizing-microscopic observation revealed that the liquid-crystal phase transition points were as follows.

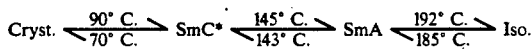

(Cryst.: Crystal phase; SmC*: Chiral smectic C phase; SmA: Smectic A phase; Iso.: Isotropic phase)

The polymer (a) was subjected to GPC (gel permeation chromatography) to measure its molecular weight distribution using a chloroform solution. As a result, the following was found:
$\overline{Mn} = 1.2 \times 10^4$.

$\overline{Mw} = 3.0 \times 10^4$.

The specific rotation was $[\alpha]_D^{25} = +4.5°$ (C=1.05; solvent: chloroform).

| NMR data (δppm (TMS)): | | |
|---|---|---|
| 1.2 | | (d, 3H, methine) |
| 3.7 | −3.85 | (m, 2H, methylene) |
| 4.5 | | (m, 6H, methylene) |
| 7.65 | | (d, 4H, phenylene) |
| 8.1 | | (d, 4H, phenylene) |

EXAMPLE 2

Example 1 was repeated except that the diol used therein was replaced with a compound (3.5 g) represented by the following formula, to give 2.8 g of a milk-white polymer (b).

$$HO-CH_2-\underset{*}{\overset{CH_3}{\underset{|}{CH}}}-O(CH_2CH_2O)_{\overline{2}}H$$

Polymer (b):

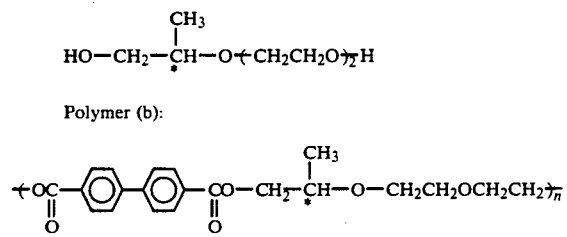

DSC measurement and polarizing-microscopic observation revealed that the liquid-crystal phase transition points were as follows:

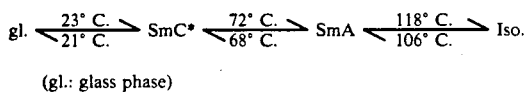

(gl.: glass phase)

The molecular weight distribution and specific rotation of the polymer (b) were measured to obtain the following results:
$\overline{Mn} = 1.3 \times 10^4$
$\overline{Mw} = 4.0 \times 10^4$
$[\alpha]_D^{25} = +4.0$ (C=1.02; solvent: chloroform).

| NMR data (δppm (TMS)): | |
|---|---|
| 1.2 | (d, H, methine) |
| 4.5 | (m, 1H, methylene) |
| 7.7 | (d, 4H, phenylene) |
| 8.1 | (d, 4H, phenylene) |

EXAMPLE 3

Using the polymeric liquid-crystalline compounds (a) and (b) obtained in Examples 1 and 2, films were obtained, respectively, in the following way.

The above compounds were each made into a 20 wt. % solution of dichloroethane, and casted on a glass plate, followed by drying to form films, which were then monoaxially stretched by 200% at 100° C. to give a monoaxially oriented films of 10 μm thick each.

The resulting stretched films were each pressure-bonded between a pair of glass substrates each provided thereon with a flat ITO electrode (thickness: 1,300 Å) on which a polyimide aligning film of 600 Å thick having been subjected to rubbing was formed. The devices were gradually cooled from Isotropic phase to 130° C., 63° C., respectively (SmC* phase), and thereafter a voltage of ±20 V/μm was applied in the state of the SmC* phase. As a result, there were shown responses at a speed of about 80 msec in the film of (a) and about 90 msec in the film of (b).

EXAMPLE 4

A test was carried out to examine the compatiblity between the polymeric liquid-crystalline compound (a) obtained in Example 1 and the low-molecular liquid crystal (14) previously shown. As a result, the same phase as that of the low-molecular liquid crystal (14) was recognized over a wide compositional range. Table 1 shows phase transition temperatures of polymeric liquid-crystal compositions of various blend systems between the compound (a) and the liquid crystal (14).

TABLE 1

| Compositional ratio (a)/(14) | Cryst. | ← | SmC* | ← | SmA | ← | Iso. |
|---|---|---|---|---|---|---|---|
| | | | Temperature (°C.) | | | | |
| 0/1 | 84 | | 144 | | 162 | | |
| 1/4 | 80 | | 144 | | 163 | | |
| 1/1 | 75 | | 146 | | 168 | | |
| 1/0 | 70 | | 143 | | 185 | | |

EXAMPLE 5

The polymeric liquid-crystal compositions (compositional ratio of (a)/(14): 1/4, 1/1) shown in Example 4 were each sealed, as they were in the state of an isotropic phase, into a liquid-crystal cell as shown in FIG. 1, comprising a pair of glass substrates 1 and 1' respectively provided thereon with flat ITO electrodes 2 and 2' (thickness: 1,300 Å) on which polyimide aligning films 3 and 3' of 600 Å thick having been subjected to rubbing were respectively formed, which substrates were adhered through an adhesive layer 4 in the manner that the thickness of a liquid-crystal layer between the substrates was set to be 10 μm. Under observation with a polarizing microscope, an electric field of ±20 V/μm was applied to the device where the liquid crystal rendered the SmC* phase. As a result, it was observed that the molecules were inverted in response to the electric field. Table 2 shows the speed of response to the electric field.

As shown in FIG. 2, the above liquid-crystal device, designated by reference numeral 8, was inserted between two polarizing plates 6 and 6' crossing at right angles and then an electric field was applied in the same manner as in the above. As a result, it was observed that light and dark changes in transmitted light were produced in response to the electric field. In FIG. 2, the arrows denoted as 7 and 7' indicate the polarizing directions of the polarizing plates 6 and 6', respectively.

TABLE 2

| Compositional ratio (a)/(14) | Temperature (°C.) | Response speed |
|---|---|---|
| 1/4 | 100 | 900 μs |
| " | 110 | 680 μs |
| " | 130 | 600 μs |
| 1/1 | 100 | 2.5 ms |
| " | 130 | 1.8 ms |

EXAMPLE 6

Example 1 was repeated except that the diol used therein was replaced with two kinds of compounds represented by the following formulas, which were used in the compositional ratios as shown in Table 3. Copolymers (c) were thus obtained.

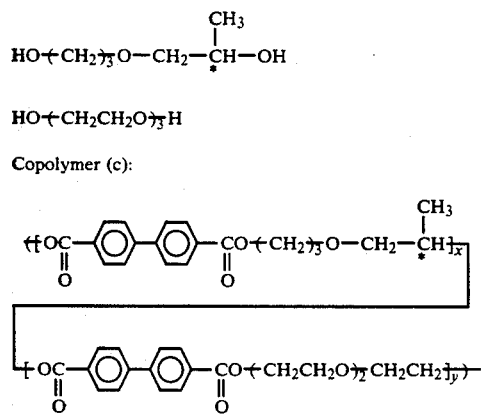

Liquid-crystal devices were prepared in the same manner as in Example 3 from the copolymers having the respective compositional ratios (Examples 6-1 and 6-2). A voltage of ±20 V/μm was applied to the devices where the liquid crystal rendered the chiral smectic C phase, and response speeds were observed to obtain the results as shown in Table 3.

COMPARATIVE EXAMPLE 1

Example 6 was repeated but using polymer of x=0, to obtain the results shown in Table 3.

TABLE 3

| x (mol %) | y (mol %) | Response speed (msec.) | Mn/Mw |
|---|---|---|---|
| Example: | | | |
| 6-1    75 | 25 | 150 | $1.1 \times 10^4 / 2.2 \times 10^4$ |
| 6-2    50 | 50 | 80 | $8.5 \times 10^3 / 1.8 \times 10^4$ |
| Comparative Example: | | | |
| 1        0 | 100 | No response | $1.4 \times 10^4 / 4.3 \times 10^4$ |

EXAMPLE 7

A test was carried out to examine the compatibility between the copolymer (c)-1 obtained in Example 6-1 and the low-molecular liquid crystal (14). As a result, the same phase as that of the low-molecular liquid crystal (14) was recognized over a wide compositional range. Table 4 shows phase transition temperatures of polymeric liquid-crystal compositions of various blend systems between the copolymer (c)-1 and the liquid crystal (14).

TABLE 4

| Compositional ratio (c)-1/(14) | Cryst. ← | Smc* ← | SmA ← | Iso. |
|---|---|---|---|---|
| | | Temperature (°C.) | | |
| 0/1 | 84 | 144 | 162 | |
| 1/4 | 95 | 135 | 149 | |
| 1/1 | 35 | 103 | 130 | |
| 1/0 | 46 | 80 | 125 | |

The polymeric liquid-crystal compositions (compositional ratio of (c)-1/(14): 1/4, 1/1) shown in Example 7 were each sealed, as they were in the state of an isotropic phase, into the same liquid-crystal device as in Example 5. An electric field of ±20 V/μm applied to the device were the liquid crystal rendered the SmC* phase. As a result, it was observed that the molecules were inverted in response to the electric field. Table 5 shows the speed of response to the electric field.

TABLE 5

| Compositional ratio (c)-1/(14) | Temperature (°C.) | Response speed |
|---|---|---|
| 1/4 | 110 | 1.2 ms |
| " | 120 | 0.9 ms |
| 1/1 | 60 | 4.2 ms |
| " | 90 | 2.0 ms |

EXAMPLE 9

Example 1 was repeated except that the diol used therein was replaced with two kinds of compounds represented by the following formulas, which were used in the compositional ratios as shown in Table 6. Copolymers (d) were thus obtained.

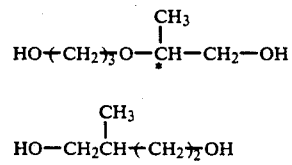

Copolymer (d):

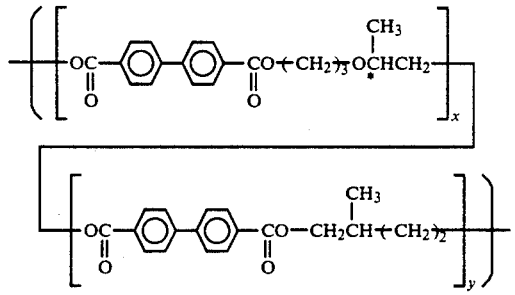

Figure 3:
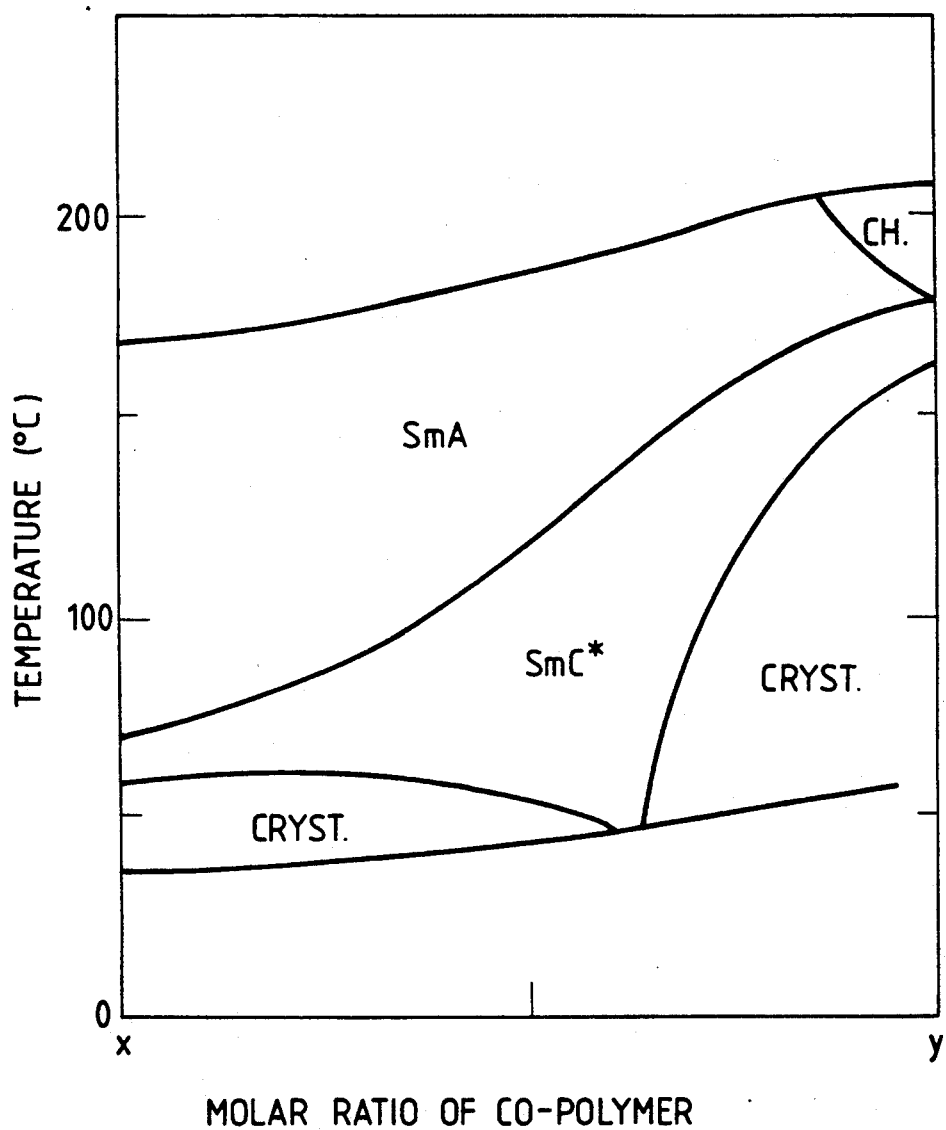
FIG. 3 is a view to illustrate Example 9.

FIG. 3 shows a phase diagram based on the results of DSC measurement and polarizing-microscopic observation. In the drawing, "Ch" indicates "Cholesteric phase".

Liquid-crystal devices were prepared in the same manner as in Example 3 from the copolymers having the respective compositional ratios. A voltage of +20 V/μm was applied to the devices where the liquid crystal rendered the chiral smectic C phase, and response speeds were observed to obtain the results as shown in Table 2.

COMPARATIVE EXAMPLE 2

Example 9 was repeated but using a polymer of x=0, to obtain the results shown in Table 6.

TABLE 6

| x (mol %) | y (mol %) | Response speed (msec.) | Mn/Mw |
|---|---|---|---|
| Example 9: | | | |
| 100 | 0 | 200 | $8.5 \times 10^3 / 1.6 \times 10^4$ |
| 70 | 30 | 70 | $8.2 \times 10^3 / 1.5 \times 10^4$ |
| 50 | 50 | 40 | $6.4 \times 10^3 / 1.1 \times 10^4$ |

TABLE 6-continued

| x (mol %) | y (mol %) | Response speed (msec.) | Mn/Mw |
|---|---|---|---|
| 20 | 80 | 300 | $8.7 \times 10^3 / 1.6 \times 10^4$ |
| Comparative Example 2: | | | |
| 0 | 100 | No response | $6.3 \times 10^3 / 1.2 \times 10^4$ |

COMPARATIVE EXAMPLE 3

The polymeric liquid-crystalline compound represented by the following structural formula was formed into a film, and the film was monoaxially stretched. The film thus treated was inserted between glass substrates each provided thereon with an ITO transparent electrode on which a polyimide aligning film was formed, which substrates were pressure-bonded by heating in the manner that its thickness was set to be about 5 μm. The device was gradually cooled from Isotropic phase to SmC* phase and an alignment with multiple domains was obtained. Using relatively large domains among them, a voltage of ±20 V/μm was applied to reveal that there was shown a response speed of about 500 msec.

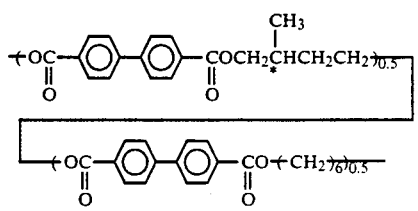

$\overline{Mn} = 5.3 \times 10^3$.
$\overline{Mw} = 8.5 \times 10^3$.

EXAMPLE 10

A copolymer was obtained in the same manner as in Example 9 except that the diol in Example 1 was replaced with two kinds of compounds represented by the following formulas.

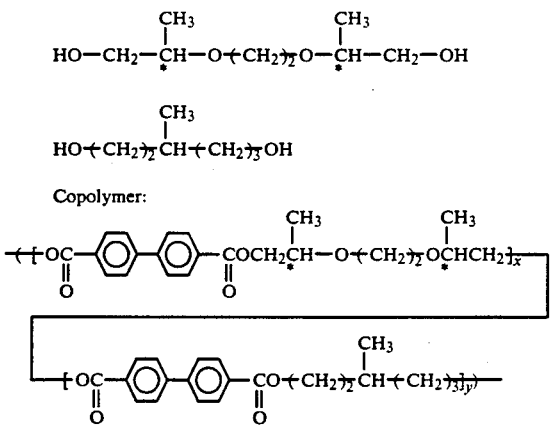

Figure 10:
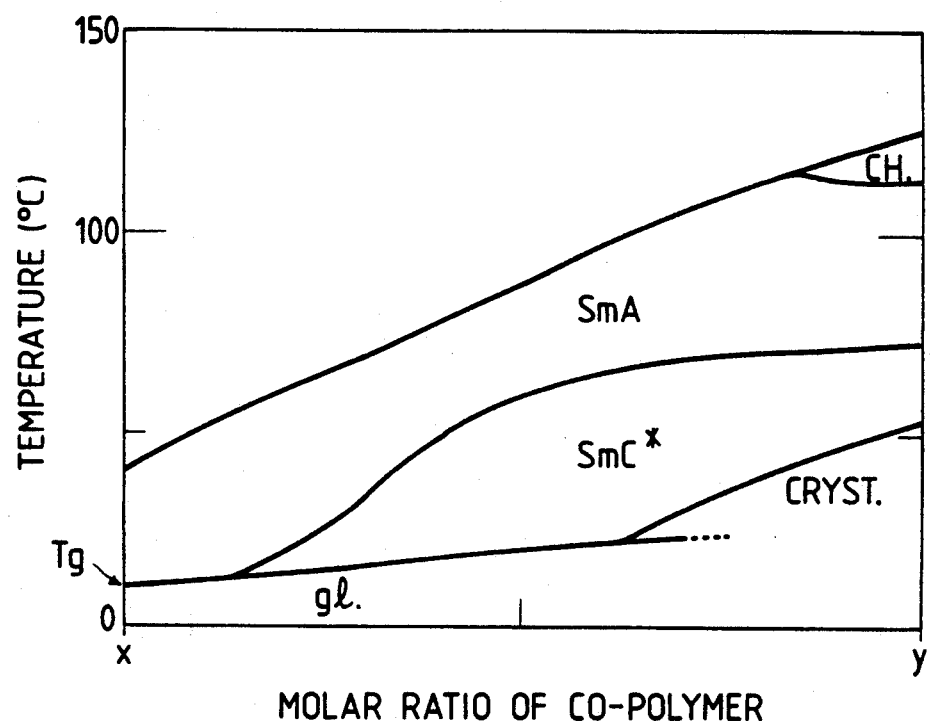
FIG. 10 is a view to illustrate Example 10.

FIG. 10 shows a phase diagram based on the results of DSC measurement and polarizing-microscopic observation. In the drawing, "Tg" indicates "Glass transition temperature".

| Molecular weight of the copolymer shown in FIG. 10: | | | | |
|---|---|---|---|---|
| x = | 100 | 75 | 50 | 25 |
| Mn: | $1.2 \times 10^4$ | $1.4 \times 10^4$ | $8.9 \times 10^3$ | $6.5 \times 10^3$ |
| Mw: | $3.3 \times 10^4$ | $2.3 \times 10^4$ | $1.5 \times 10^4$ | $1.2 \times 10^4$ |

COMPARATIVE EXAMPLE 4

Example 1 was repeated except that the diol used therein was replaced with a compound represented by the following formula, to give a polymeric liquid-crystalline compound represented by the following structural formula.

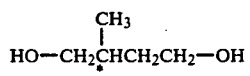

Polymer:

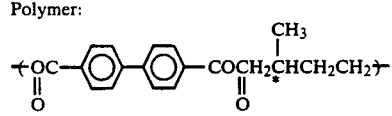

$\overline{Mn} = 7.8 \times 10^3$
$\overline{Mw} = 1.8 \times 10^4$

DSC measurement and polarizing-microscopic observation revealed that the liquid-crystal phase transition points were as follows, and the liquid crystal rendered the SmC* phase only in the cource of the temperature drop.

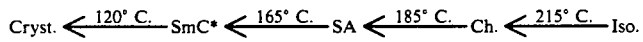

COMPARATIVE EXAMPLE 5

Example 1 was repeated except that the diol used therein was replaced with a compound (1.5 g) represented by the following formula, to give 1.2 g of a polymer (e).

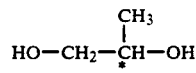

Polymer (e);

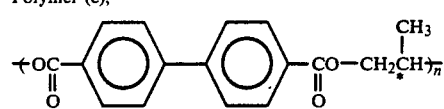

Phase transition point of the polymer (c):

$\overline{Mn} = 1.2 \times 10^4$
$\overline{Mw} = 3/3 \times 10^4$

EXAMPLES 11 TO 16

Example 1 was repeated except that the compounds used therein was replaced with the combinations of mesogen group precursors and diols as shown in the following Table 7. Polymers as shown in Table 8 were thus obtained.

TABLE 7

| Example | Mesogen group precursor | Diol |
|---|---|---|
| 11 | $H_5C_2OOC$—(pyridine)—(phenyl)—$COOC_2H_5$ | $HO{-}(CH_2)_5{-}OCH(CH_3)CH_2{-}OH$ |
| 12 | $H_5C_2OOC$—(pyrazine)—(phenyl)—$COOC_2H_5$ | $HO{-}CH_2CH(CH_3)O{-}(CH_2)_6{-}OCH(CH_3)CH_2{-}OH$ |
| 13 | $H_5C_2OOC$—(phenyl)—CH=CH—(phenyl)—$COOC_2H_5$ | $HO{-}(CH_2)_5{-}OCH_2CH(CH_3){-}OH$ |
| 14 | $H_5C_2OOC$—(phenyl)—N=N—(phenyl)—$COOC_2H_5$ | $HO{-}(CH_2)_6{-}OCH_2CH(CH_3){-}OH$ |
| 15 | $H_5C_2OOC$—(phenyl)—CH=N—(phenyl)—$COOC_2H_5$ | $HO{-}CH_2CH(CH_3)O{-}(CH_2)_5{-}OCH(CH_3)CH_2{-}OH$ |
| 16 | $H_5C_2OOC$—(cyclohexyl-H)—(phenyl)—$COOC_2H_5$ | $HO{-}(CH_2)_3{-}OCH_2CH(CH_3){-}OH$ |

TABLE 8

| Example | Polymer | $\overline{Mn}/\overline{Mw}$ |
|---|---|---|
| 11 | $\{{-}OC{-}(pyridine){-}(phenyl){-}CO{-}(CH_2)_5OCH(CH_3)CH_2{-}\}_n$ | $8.6 \times 10^3 / 2.4 \times 10^4$ |
| 12 | $\{{-}OC{-}(pyrazine){-}(phenyl){-}CO{-}CH_2CH(CH_3)O{-}(CH_2)_6OCH(CH_3)CH_2{-}\}_n$ | $9.3 \times 10^3 / 2.5 \times 10^4$ |
| 13 | $\{{-}OC{-}(phenyl){-}CH=CH{-}(phenyl){-}CO{-}(CH_2)_5OCH_2CH(CH_3){-}\}_n$ | $1.5 \times 10^4 / 4.2 \times 10^4$ |
| 14 | $\{{-}OC{-}(phenyl){-}N=N{-}(phenyl){-}CO{-}(CH_2)_6OCH(CH_3)CH_2{-}\}_n$ | $8.2 \times 10^3 / 2.3 \times 10^4$ |
| 15 | $\{{-}OC{-}(phenyl){-}CH=N{-}(phenyl){-}CO{-}CH_2CH(CH_3)O{-}(CH_2)_5OCH(CH_3)CH_2{-}\}_n$ | $1.1 \times 10^4 / 2.7 \times 10^4$ |
| 16 | $\{{-}OC{-}(cyclohexyl-H){-}(phenyl){-}CO{-}(CH_2)_3OCH_2CH(CH_3){-}\}_n$ | $1.0 \times 10^4 / 2.2 \times 10^4$ |

DSC measurement and polarizing-microscopic observation revealed that the liquid-crystal phase transition points were as shown in Table 9.

TABLE 9

| Example | Phase transition point (°C.) |
|---|---|
| 11 | gl. $\underset{38}{\overset{43}{\rightleftarrows}}$ SmC* $\underset{132}{\overset{135}{\rightleftarrows}}$ SmA $\underset{168}{\overset{175}{\rightleftarrows}}$ Iso. |
| 12 | gl. $\underset{5}{\overset{8}{\rightleftarrows}}$ SmC* $\underset{42}{\overset{47}{\rightleftarrows}}$ SmA $\underset{64}{\overset{75}{\rightleftarrows}}$ Iso. |
| 13 | gl. $\underset{15}{\overset{21}{\rightleftarrows}}$ SmC* $\underset{109}{\overset{116}{\rightleftarrows}}$ SmA $\underset{163}{\overset{170}{\rightleftarrows}}$ Iso. |
| 14 | gl. $\underset{19}{\overset{22}{\rightleftarrows}}$ SmC* $\underset{83}{\overset{87}{\rightleftarrows}}$ SmA $\underset{156}{\overset{163}{\rightleftarrows}}$ Iso. |
| 15 | gl. $\underset{3}{\overset{7}{\rightleftarrows}}$ SmC* $\underset{53}{\overset{58}{\rightleftarrows}}$ SmA $\underset{82}{\overset{90}{\rightleftarrows}}$ Iso. |
| 16 | gl. $\underset{26}{\overset{30}{\rightleftarrows}}$ SmC* $\underset{72}{\overset{73}{\rightleftarrows}}$ SmA $\underset{137}{\overset{145}{\rightleftarrows}}$ Iso. |

EXAMPLE 17

To a solution of 3.7 g of 4,4'-dihydroxybiphenyl in 150 ml of pyridine kept at 5° C. or less under an atmosphere of nitrogen gas, a dichloromethane solution of 5.1 g of a chlorocarbonate compound represented by the formula

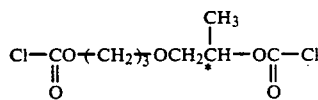

was dropwise added with stirring. After stirring for 1 hour, the reaction mixture was further stirred at room temperature for 40 hours. The reaction mixture was treated with a dilute hudrochloric acid, and then the dichloromethane solution was washed with water. The concentrated dichloromethane solution was put into methanol, and the precipitate thus produced was purified several times by the same procedure, followed by drying under reduced pressure to give 1.8 g of a polymer of the formula

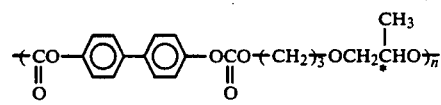

$\overline{Mn}/\overline{Mw} = 8,300/19,000$.

$[\alpha]_D^{25} = +4.8°$ (C=0.95; solvent: chloroform).

| NMR data (δppm (TMS)): | |
|---|---|
| 1.4 | (d; 3H, methyl) |
| 2.1 | (m; 2H, methylene) |
| 3.6, 4.5 | (m, t; 6H, methylene) |
| 5.3, | (m, 1H, methine) |
| 7.6, | (d; 4H, phenylene) |
| 8.0, | (d; 4H, phenylene) |

Liquid-crystal phase transition points were as follows:

gl. $\underset{24°\text{C.}}{\overset{26°\text{C.}}{\rightleftarrows}}$ SmC* $\underset{92°\text{C.}}{\overset{96°\text{C.}}{\rightleftarrows}}$ SmA $\underset{122°\text{C.}}{\overset{130°\text{C.}}{\rightleftarrows}}$ Iso.

EXAMPLE 18

The following polymer was obtained in the same manner as in Example 1.

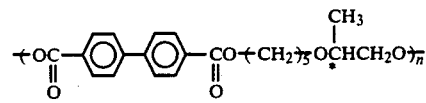

$\overline{Mn} = 1.0 \times 10^4$.
$\overline{Mw} = 2.3 \times 10^4$.

As a result, liquid-crystal phase transition points were as follows:

Cryst. $\underset{43°\text{C.}}{\overset{56°\text{C.}}{\rightleftarrows}}$ SmC* $\underset{95°\text{C.}}{\overset{100°\text{C.}}{\rightleftarrows}}$ SmA $\underset{150°\text{C.}}{\overset{160°\text{C.}}{\rightleftarrows}}$ Iso.

As having been described above, it is possible according to the present invention to readily obtain a novel polymeric liquid-crystalline compound or copolymerized polymeric liquid-crystalline compound and a liquid-crystal composition containing these polymeric liquid-crystalline compounds and a low-molecular liquid crystal, that can render a chiral smectic phase (Sm* phase) over a wide temperature range, can stably exhibit the chiral smectic phase at the time of both temperature rise and temperature drop, and also can form a thin film or be formed into a film with ease.

Besides, formation of a variety of copolymerized polymeric liquid-crystalline compounds makes it possible to give variety to the control of liquid-crystal temperature range or the control of electrical characteristics.

Moreover, when these polymeric liquid-crystalline compound, copolymerized polymeric liquid-crystalline compound and liquid-crystal composition are applied in liquid-crystal devices, the large-area device can be readily achieved. At the same time, application of an electric field when the liquid crystal renders the SmC* phase brings about a stable and good switching effect, so that it is possible to obtain liquid-crystal devices capable of being utilized as devices in which various electro-optic effects are applied.

In addition, when the liquid-crystal composition comprising the specific polymeric liquid-crystalline compounds of the present invention is obtained, the response can be improved compared with the sole use of the polymeric liquid-crystalline compound or the copolymerized polymeric liquid-crystalline compound and hence the present invention can be made more useful in view of the functions required when used as the device prepared in the form of a film.

Furthermore, the copolymerization with a polymeric liquid crystal having a smectic phase is carried out to widen and stabilize the temperature range of a chiral smectic phase so that the chiral smectic phase rendered when a polymeric liquid crystal having an optically active group is formed can be stably exhibited and the temperature range therefor can be more expanded. Hence, it is possible to provide more useful copolymerized polymeric liquid-crystalline compound and compositions thereof. Thus, the present invention can be said to be more effective for settling the existing circumstances in which the polymeric liquid crystals comprising a main chain having an optically active group and a mesogen group have sufficiently exhibited the chiral smectic phase only in a few examples and have had limitations on their utilization.

What is claimed is:

1. A polymeric liquid-crystalline compound having in its repeating unit a moiety represented by the following formula (M)

$$X_1-A-X_2-B \qquad (M)$$

wherein A represents a bicyclic mesogen; B represents a flexible group represented by the formula

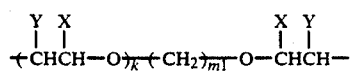

wherein X represents a hydrogen atom or a methyl group and Y represents a hydrogen atom or a methyl group, provided that X is not the same as Y, k is 0 or 1, and m1 is 1 to 18, or

wherein X represents a hydrogen atom or a methyl group and Y represents a hydrogen atom or a methyl group, provided that X is not the same as Y, k is 0 or 1, m2 is 2 to 10 and m3 is 2 to 5; and $X_1$ and $X_2$ each represent a group containing any one of an ester bond, an ether bond and a carbonate bond, and may be the same or different from each other.

2. A liquid-crystal device comprising a substrate and, provided thereon, a film comprising the polymeric liquid-crystalline compound according to claim 1.

3. The liquid-crystal device according to claim 2, wherein said film has been subjected to alignment treatment.

4. The liquid-crystal device according to claim 3, wherein said alignment treatment is a stretching alignment treatment.

5. The liquid-crystal device according to claim 3, which is further provided with an aligning film.

6. A liquid-crystal composition comprising the polymeric liquid-crystalline compound according to claim 1 and at least one of other polymeric compound and a low-molecular compound.

7. The liquid-crystal composition according to claim 6, wherein said polymeric liquid-crystalline compound is contained in an amount of not less than 5 parts by weight based on 100 parts by weight of the liquid-crystal composition.

8. The liquid-crystal composition according to claim 6, wherein said polymeric liquid-crystalline compound is contained in an amount of not less than 10 parts by weight based on 100 parts by weight of the liquid-crystal composition.

9. A liquid-crystal device comprising a substrate and, provided thereon, a film comprising the liquid-crystal composition according to claim 6.

10. The liquid-crystal device according to claim 9, wherein said film has been subjected to alignment treatment.

11. The liquid-crystal device according to claim 10, wherein said alignment treatment is a stretching alignment treatment.

12. The liquid-crystal device according to claim 10, which is further provided with an aligning film.

13. A polymeric liquid-crystalline compound according to claim 1 wherein said group represented by A is a bicyclic mesogen group represented by the formula

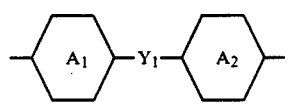

wherein

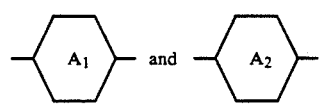

are each selected from any one of

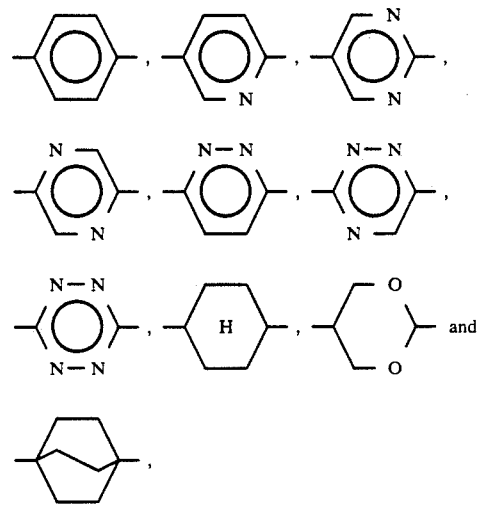

provided that at least one of

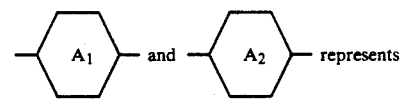 represents

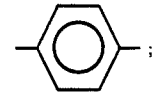

and $Y_1$ represents any one of a single bond, —CH=CH—, —C≡C—, —N=N—,

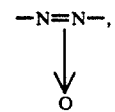

—CH=N—, —CH$_2$CH$_2$— and —CH$_2$O—.

14. The polymeric liquid-crystalline compound according to claim 13, wherein said

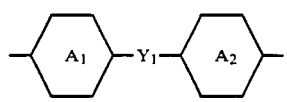

is selected from the following structural formulas:

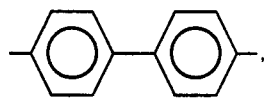

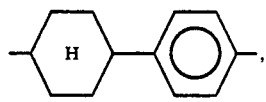

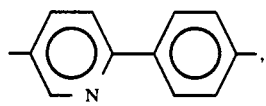

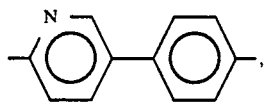

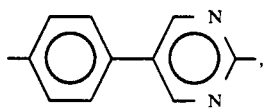

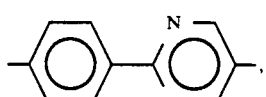

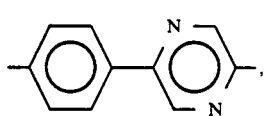

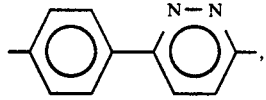

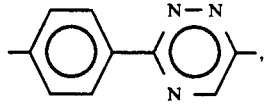

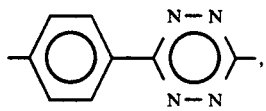

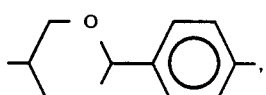

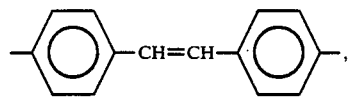

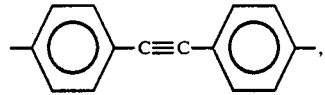

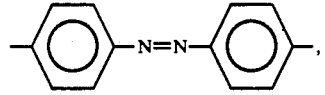

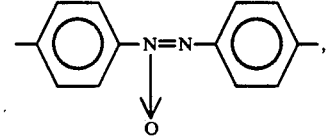

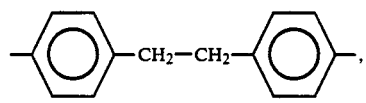

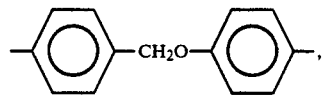

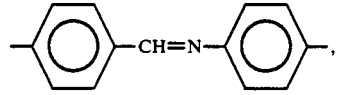

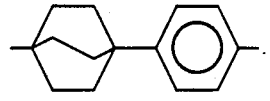

15. The polymeric liquid-crystalline compound according to claim 13, wherein said group represented by B is selected from the following structural formulas:

$$+CH_2 \!\!\!\overline{\,\,)_{m1}}\!\!-O-\overset{CH_3}{\underset{*}{C}H}-CH_2-,$$

$$+CH_2 \!\!\!\overline{\,\,)_{m1}}\!\!-O-CH_2-\overset{CH_3}{\underset{*}{C}H}-,$$

$$-CH_2-\overset{CH_3}{\underset{*}{C}H}-O+CH_2\!\!\!\overline{\,\,)_{m1}}\!\!-O-\overset{CH_3}{\underset{*}{C}}HCH_2-,$$

$$-\overset{CH_3}{\underset{*}{C}H}-CH_2-O+CH_2\!\!\!\overline{\,\,)_{m1}}\!\!-O-CH_2-\overset{CH_3}{\underset{*}{C}H}-,$$

$$+(CH_2\!\!\!\overline{\,\,)_{m2}}\!\!-O\!\!\overline{\,\,)_{m3}}\!\!-CH_2-\overset{CH_3}{\underset{*}{C}H}-,$$

$$+(CH_2\!\!\!\overline{\,\,)_{m2}}\!\!-O\!\!\overline{\,\,)_{m3}}\!\!-\overset{CH_3}{\underset{*}{C}H}-CH_2-,$$

-continued

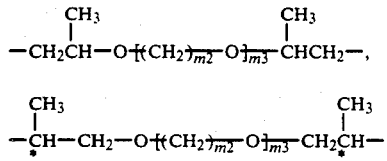

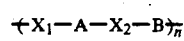

16. A liquid-crystal device comprising a substrate and, provided thereon, a film comprising the polymeric liquid-crystalline compound according to claim 13.

17. The liquid-crystal device according to claim 16, wherein said film has been subjected to alignment treatment.

18. The liquid-crystal device according to claim 15, wherein said alignment treatment is a stretching alignment treatment.

19. The liquid-crystal device according to claim 17, which is further provided with an aligning film.

20. A liquid-crystal comprising the polymeric liquid-crystalline compound according to claim 13, and at least one of other polymeric compound and a low-molecular compound.

21. The liquid-crystal composition according to claim 20, wherein said polymeric liquid-crystalline compound is contained in an amount of not less than 5 parts by weight based on 100 parts by weight of the liquid-crystal composition.

22. The liquid-crystal composition according to claim 20, wherein said polymeric liquid-crystalline compound is contained in an amount of not less than 10 parts by weight based on 100 parts by weight of the liquid-crystal composition.

23. A liquid-crystal device comprising a substrate and, provided thereon, a film comprising the liquid-crystal composition according to claim 20.

24. The liquid-crystal device according to claim 23, wherein said film has been subjected to alignment treatment.

25. The liquid-crystal device according to claim 24, wherein said alignment treatment is a stretching alignment treatment.

26. The liquid-crystal device according to claim 24, which is further provided with an aligning film.

27. A polymeric liquid-crystalline compound comprising a main chain having a repeating unit represented by any one of the following formulas (I), (II) and (III):

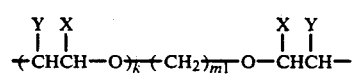 (I)

wherein A represents a bicyclic mesogen; B represents a flexible group represented by the formula

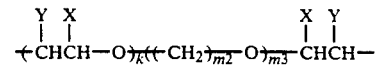

wherein X represents a hydrogen atom or a methyl group and Y represents a hydrogen atom or a methyl group, provided that X is not the same as Y, k is 0 or 1, and m1 is 1 to 18, or

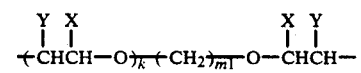

wherein X represents a hydrogen atom or a methyl group and Y represents a hydrogen atom or a methyl group, provided that X is not the same as Y, k is 0 or 1, m2 is 2 to 10 and m3 is 2 to 5;

X₁ and X₂ each represent a group containing any one of an ester bond, an ether bond and a carbonate bond, and may be the same or different from each other; and n represents 5 to 1,000,

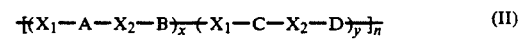 (II)

wherein A represents a bicyclic mesogen; B represents a flexible group represented by the formula

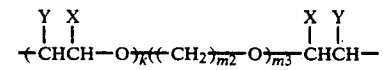

wherein X represents a hydrogen atom or a methyl group and Y represents a hydrogen atom or a methyl group, provided that X is not the same as Y, k is 0 or 1, and m1 is 1 to 18, or

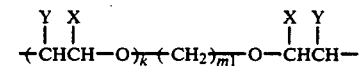

wherein X represents a hydrogen atom or a methyl group and Y represents a hydrogen atom or a methyl group, provided that X is not the same as Y, k is 0 or 1, m2 is 2 to 10 and m3 is 2 to 5;

C represents a mesogen group which may be the same as or different from A; D represents a group represented by the same formula as B but with a different molecular structure or represents a different flexible group; X₁ and X₂ each represent a group containing any one of an ester bond, an ether bond and a carbonate bond, and may be the same or different from each other; n represents 5 to 1,000; and x+y=1, and

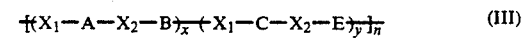 (III)

wherein A represents a bicyclic mesogen; B represents a flexible group represented by the formula

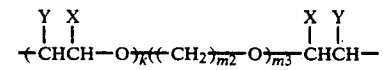

wherein X represents a hydrogen atom or a methyl group and Y represents a hydrogen atom or a methyl group, provided that X is not the same as Y, k is 0 or 1, and m1 is 1 to 18, or

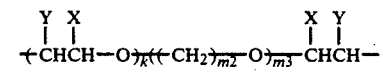

wherein X represents a hydrogen atom or a methyl methyl group, provided that X is not the same as Y, k is 0 or 1, m2 is 2 to 10 and m3 is 2 to 5;

C represents a mesogen group which may be the same as or different from A; E represents a flexible group containing no optically active group; $X_1$ and $X_2$ each represent a group containing any one of an ester bond, an ether bond and a carbonate bond, and may be the same or different from each other; n represents 5 to 1,000; x+y=1; and the homopolymer having a repeating unit of the polymeric liquid crystal represented by $$+X_1-C-X_2-E+$$

in the formula renders a smectic C phase.

28. A liquid-crystal device comprising a substrate and, provided thereon, a film comprising the polymeric liquid-crystalline compound according to claim 27.

29. The liquid-crystal device according to claim 28, wherein said film has been subjected to alignment treatment.

30. The liquid-crystal device according to claim 29, wherein said alignment treatment is a stretching alignment treatment.

31. The liquid-crystal device according to claim 29, which is further provided with an aligning film.

32. A liquid-crystal composition comprising the polymeric liquid-crystalline compound according to claim 27 and at least one of other polymeric compound and a low-molecular compound.

33. The liquid-crystal composition according to claim 32, wherein said polymeric liquid-crystalline compound is contained in an amount of not less than 5 parts by weight based on 100 parts by weight of the liquid-crystal composition.

34. The liquid-crystal composition according to claim 32, wherein said polymeric liquid-crystalline compound is contained in an amount of not less than 10 parts by weight based on 100 parts by weight of the liquid-crystal composition.

35. A liquid-crystal device comprising a substrate and, provided thereon, a film comprising the liquid-crystal composition according to claim 32.

36. The liquid-crystal device according to claim 35, wherein said film has been subjected to alignment treatment.

37. The liquid-crystal device according to claim 36, wherein said alignment treatment is a stretching alignment treatment.

38. The liquid-crystal device according to claim 36, which is further provided with an aligning film.

39. A polymeric liquid-crystalline compound having in its repeating unit a moiety represented by the following formula (M)

$$X_1-A-X_2-B \quad (M)$$

wherein A represents a bicyclic mesogen group represented by the formula

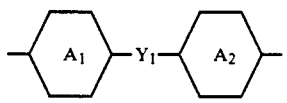

wherein

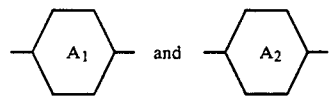

are each selected from any one of

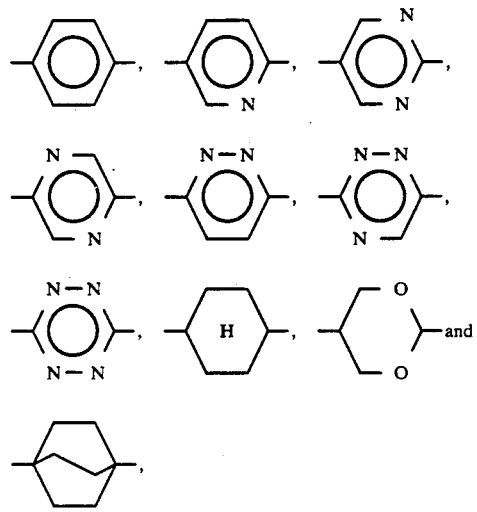

provided that at least one of

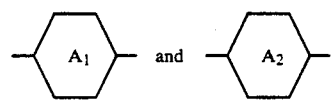

represents 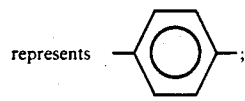;

and $Y_1$ represents any one of a single bond, —CH=CH—, —C≡C—, —N=N—,

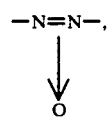

—CH=N—, —CH$_2$CH$_2$— and —CH$_2$O—; B represents a flexible group represented by the formula

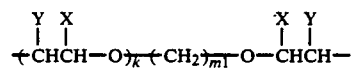

wherein X represents a hydrogen atom or a methyl group and Y represents a hydrogen atom or a methyl group, provided that X is not the same as Y, k is 0 or 1, and m1 is 1 to 18, or

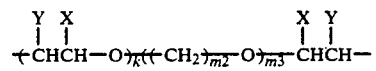

wherein X represents a hydrogen atom or a methyl group and Y represents a hydrogen atom or a methyl group, provided that X is not the same as Y, k is 0 or 1, m2 is 2 to 10 and m3 is 2 to 5; and X₁ and X₂ each represent a group containing any one of an ester bond, an ether bond and a carbonate bond, and may be the same or different from each other, wherein said polymeric liquid-crystalline compound comprises a main chain having a repeating unit represented by any one of the following formulas (Ia), (IIa) and (IIIa):

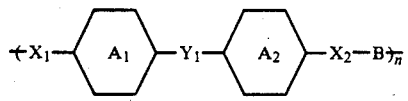
(Ia)

wherein

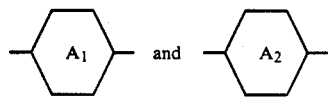

are each selected from any one of

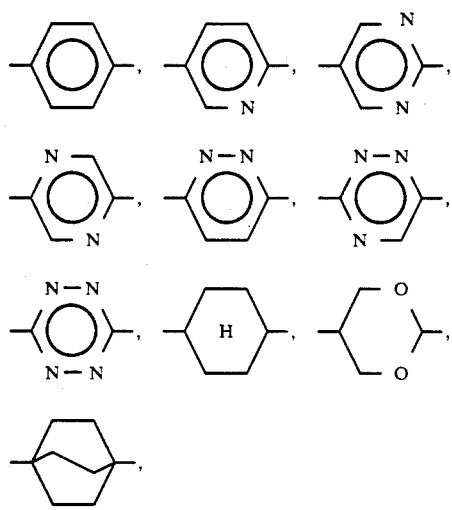

provided that at least one of

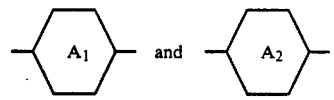

represents ;

Y₁ represents any one of a single bond, —CH=CH—, —C≡C—, —N=N—,

—CH=N—, —CH₂CH₂— and —CH₂O—; B represents a flexible group represented by the formula

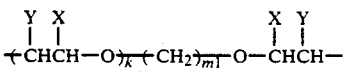

wherein X represents a hydrogen atom or a methyl group and Y represents a hydrogen atom or a methyl group, provided that X is not the same as Y, k is 0 or 1, and m1 is 1 to 18, or

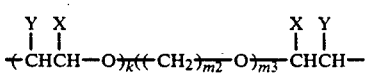

wherein X represents a hydrogen atom or a methyl group and Y represents a hydrogen atom or a methyl group, provided that X is not the same as Y, k is 0 or 1, m2 is 2 to 10 and m3 is 2 to 5;

X₁ and X₂ each represent a group containing any one of an ester bond, an ether bond and a carbonate bond, and may be the same or different from each other; and n represents 5 to 1,000,

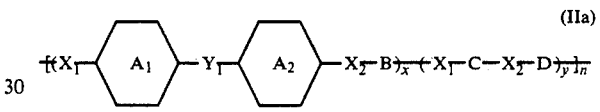
(IIa)

wherein

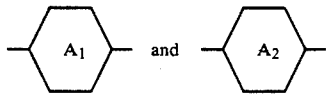

are each selected from any one of

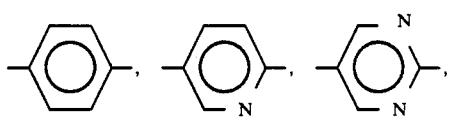

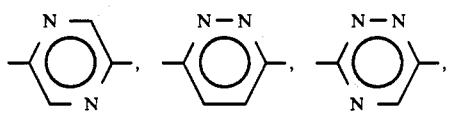

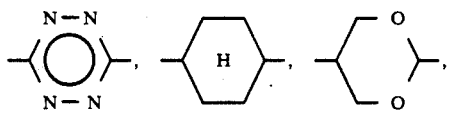

provided that at least one of

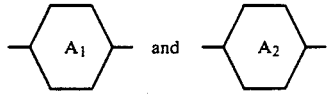

represents 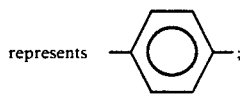;

$Y_1$ represents any one of a single bond, —CH=CH—, —C≡C—, —N=N—,

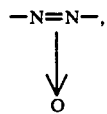

—CH=N—, —CH$_2$CH$_2$— and —CH$_2$O—; B represents a flexible group represented by the formula

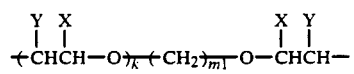

wherein X represents a hydrogen atom or a methyl group and Y represents a hydrogen atom or a methyl group, provided that X is not the same as Y, k is 0 or 1, and m1 is 1 to 18, or

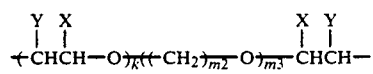

wherein X represents a hydrogen atom or a methyl group and Y represents a hydrogen atom or a methyl group, provided that X is not the same as Y, k is 0 or 1, m2 is 2 to 10 and m3 is 2 to 5;

C represents a mesogen group which may be the same as or different from

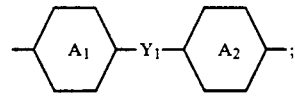

D represents a group represented by the same formula as B but with a different molecular structure or represents a different flexible group; $X_1$ and $X_2$ each represent a group containing any one of an ester bond, an ether bond and a carbonate bond, and may be the same or different from each other; n represents 5 to 1,000; and x+y=1, and x+y=1,

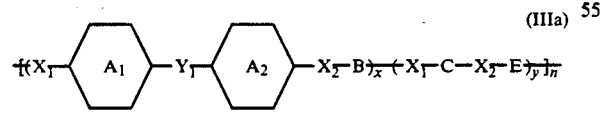 (IIIa)

wherein

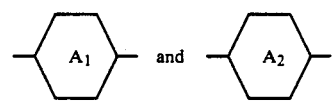

are each selected from any one of

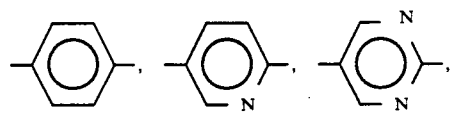

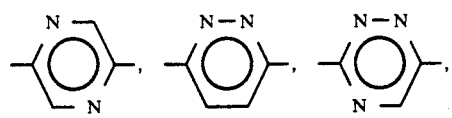

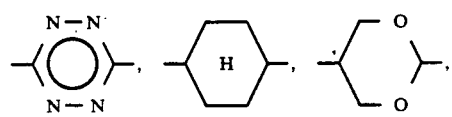

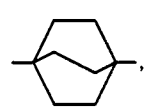

provided that at least one of

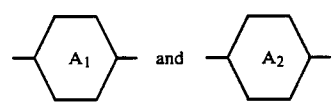

represents 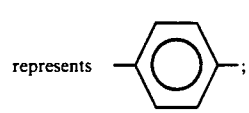;

$Y_1$ represents any one of a single bond, —CH=CH—, —C≡C—, —N=N—,

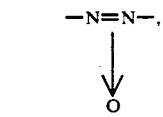

—CH=N—, —CH$_2$CH$_2$— and —CH$_2$O—; B represents a flexible group represented by the formula

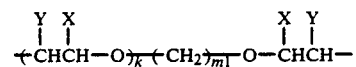

wherein X represents a hydrogen atom or a methyl group and Y represents a hydrogen atom or a methyl group, provided that X is not the same as Y, k is 0 or 1, and m1 is 1 to 18, or

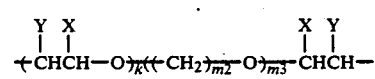

wherein X represents a hydrogen atom or a methyl group and Y represents a hydrogen atom or a methyl group, provided that X is not the same as Y, k is 0 or 1, m2 is 2 to 10 and m3 is 2 to 5;

C represents a mesogen group which may be the same as or different from

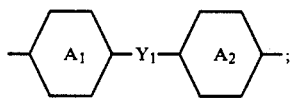

E represents a flexible group containing no optically active group; X1 and X2 each represent a group containing any one of an ester bond, an ether bond and a carbonate bond, and may be the same or different from each other; n represents 5 to 1,000; x+y=1; and the homopolymer having a repeating unit of the polymeric liquid crystal represented by

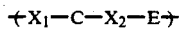

in the formula renders a smectic C phase.

40. The polymeric liquid-crystalline compound according to claim 39, wherein said

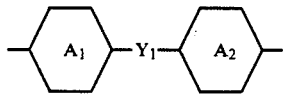

is selected from the following structural formulas:

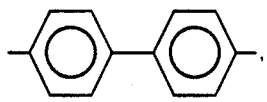

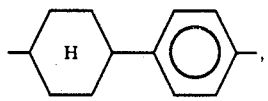

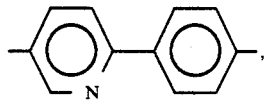

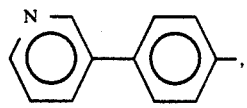

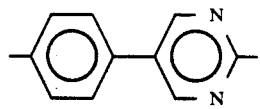

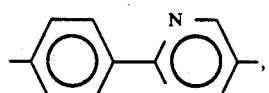

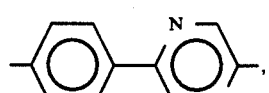

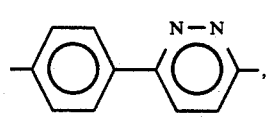

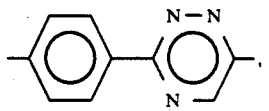

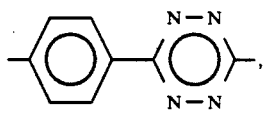

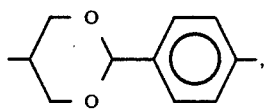

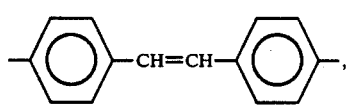

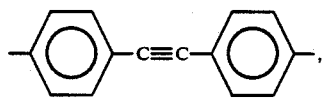

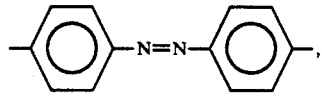

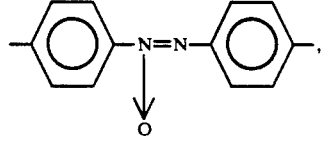

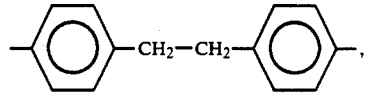

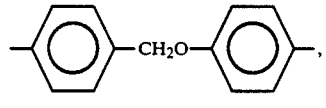

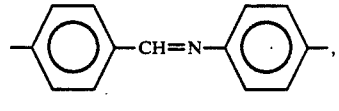

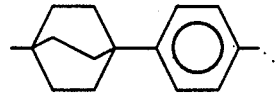

41. The polymeric liquid-crystalline compound according to claim 39, wherein said group represented by B is selected from the following structural formulas:

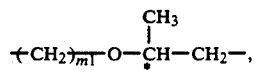

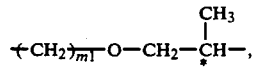

-continued

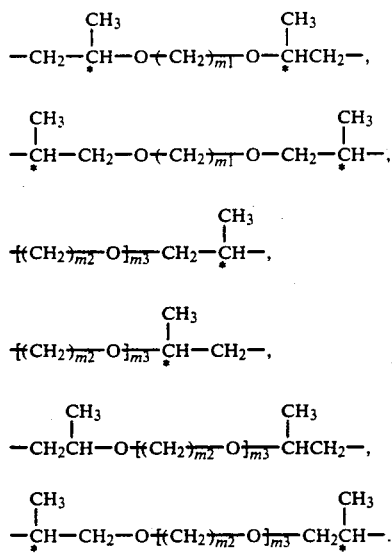

42. A liquid-crystal device comprising a substrate and, provided thereon, a film comprising the polymeric liquid-crystalline compound according to claim 39.

43. The liquid-crystal device according to claim 42, wherein said film has been subjected to alignment treatment.

44. The liquid-crystal device according to claim 43, wherein said alignment treatment is a stretching alignment treatment.

45. The liquid-crystal device according to claim 43, which is further provided with an aligning film.

46. A liquid-crystal composition comprising the polymeric liquid-crystallin compound according to claim 39 and at least one of other polymeric compound and a low-molecular compound.

47. The liquid-crystal composition according to claim 46, wherein said polymeric liquid-crystalline compound is contained in an amount of not less than 5 parts by weight based on 100 parts by weight of the liquid-crystal composition.

48. The liquid-crystal composition according to claim 46, wherein said polymeric liquid-crystalline compound is contained in an amount of not less than 10 parts by weight based on 100 parts by weight of the liquid-crystal composition.

49. A liquid-crystal device comprising a substrate and, provided thereon, a film comprising the liquid-crystal composition according to claim 46.

50. The liquid-crystal device according to claim 49, wherein said film has been subjected to alignment treatment.

51. The liquid-crystal device according to claim 50, wherein said alignment treatment is a stretching alignment treatment.

52. The liquid-crystal device according to claim 50, which is further provided with an aligning film.

* * * * *

UNITED STATES PATENT AND TRADEMARK OFFICE
CERTIFICATE OF CORRECTION

PATENT NO. : 5,185,097
DATED : February 9, 1993
INVENTOR(S) : YOMISHI TOSHIDA, ET AL.

It is certified that error appears in the above-identified patent and that said Letters Patent is hereby corrected as shown below:

ON THE TITLE PAGE:

IN [54] TITLE

"DRIVE" should read --DEVICE--.

IN [56] REFERENCES CITED

Under U.S. PATENT DOCUMENTS:
"4,721,376  1/1988  Yoshinaga et al." should read
--4,721,367  1/1988  Yoshinaga et al.--.

Under FOREIGN PATENT DOCUMENTS:
"01-93553  4/1988  Japan" should read
--01-93553  4/1989  Japan--; and
"2202981  8/1990  Japan" should read
--2-202981  8/1990  Japan--.

COLUMN 1

Line 3, "DRIVE" should read --DEVICE--.

COLUMN 2

Line 22, "liquid-crystalline," should read
--liquid-crystalline--.

COLUMN 11

Line 45, "below;" should read --below:--.

UNITED STATES PATENT AND TRADEMARK OFFICE
CERTIFICATE OF CORRECTION

PATENT NO. : 5,185,097
DATED : February 9, 1993
INVENTOR(S) : YOMISHI TOSHIDA, ET AL.

It is certified that error appears in the above-identified patent and that said Letters Patent is hereby corrected as shown below:

COLUMN 27

Example (84):

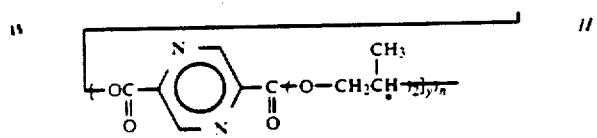

should read

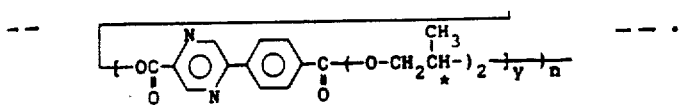

COLUMN 46

Line 31, "use." should read --used.--.

COLUMN 47

Line 54, "polymers." should read --polymers,--.

COLUMN 50

Line 14, "a" (second occurrence) should read --an--.
Line 54, "polarizing-microscopic" should read --polarizing microscope--.

UNITED STATES PATENT AND TRADEMARK OFFICE
CERTIFICATE OF CORRECTION

PATENT NO. : 5,185,097
DATED : February 9, 1993
INVENTOR(S) : YOMISHI TOSHIDA, ET AL.

It is certified that error appears in the above-identified patent and that said Letters Patent is hereby corrected as shown below:

COLUMN 54

Line 47, "polarizing-microscopic" should read --polarizing microscope--.

COLUMN 56

Line 29, "polarizing-microscopic" should read --polarizing microscope--.
Line 52, "(e);" should read --(e):--.

COLUMN 62

Line 7, "claim 1" should read --claim 1,--.

Line 11, "  "

should read -- 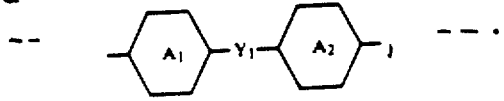 --.

COLUMN 65

Line 16, "claim 15," should read --claim 17,--.

UNITED STATES PATENT AND TRADEMARK OFFICE
CERTIFICATE OF CORRECTION

PATENT NO. : 5,185,097
DATED : February 9, 1993
INVENTOR(S) : YOMISHI TOSHIDA, ET AL.

Page 4 of 4

It is certified that error appears in the above-identified patent and that said Letters Patent is hereby corrected as shown below:

COLUMN 67

Line 65, " 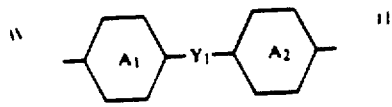 "

should read -- 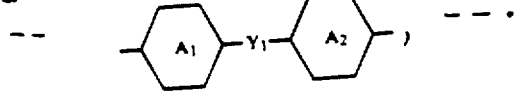 --.

COLUMN 76

Line 7, "liquid-crystallin" should read --liquid-crystalline--.

Signed and Sealed this

Fifth Day of April, 1994

Attest:

BRUCE LEHMAN

*Attesting Officer*     *Commissioner of Patents and Trademarks*